(12) United States Patent
Takayama et al.

(10) Patent No.: US 10,944,181 B2
(45) Date of Patent: Mar. 9, 2021

(54) ANTENNA MODULE AND COMMUNICATION DEVICE

(71) Applicant: Murata Manufacturing Co., Ltd., Kyoto (JP)

(72) Inventors: Keisei Takayama, Kyoto (JP); Kengo Onaka, Kyoto (JP); Hirotsugu Mori, Kyoto (JP); Satoshi Uozumi, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 16/709,083

(22) Filed: Dec. 10, 2019

(65) Prior Publication Data

US 2020/0119453 A1    Apr. 16, 2020

Related U.S. Application Data

(63) Continuation of application No. PCT/JP2018/022090, filed on Jun. 8, 2018.

(30) Foreign Application Priority Data

Jun. 14, 2017  (JP) .............................. JP2017-117242

(51) Int. Cl.
*H04B 7/04* (2017.01)
*H01Q 21/06* (2006.01)
(Continued)

(52) U.S. Cl.
CPC ....... *H01Q 21/0025* (2013.01); *H01Q 9/0421* (2013.01); *H01Q 21/065* (2013.01); *H01Q 21/245* (2013.01); *H04B 1/18* (2013.01)

(58) Field of Classification Search
CPC .......... H01Q 9/04; H01Q 21/00; H01Q 21/06; H01Q 21/24; H01Q 9/0407; H01Q 21/061;
(Continued)

(56) References Cited

U.S. PATENT DOCUMENTS 6,104,349 A * 8/2000 Cohen .................. H01Q 1/246
343/702
6,198,460 B1 * 3/2001 Brankovic ........... H01Q 1/1242
343/700 MS
(Continued)

FOREIGN PATENT DOCUMENTS

JP    2002-135044 A    5/2002
JP    2014-529971 A    11/2014
(Continued)

OTHER PUBLICATIONS

International Search Report for International Application No. PCT/JP2018/022090 dated Sep. 11, 2018.
(Continued)

*Primary Examiner* — Blane J Jackson
(74) *Attorney, Agent, or Firm* — Pearne & Gordon LLP

(57) ABSTRACT

An antenna module (1) includes a substrate (100) including a first flat plate portion (100a) and a second flat plate portion (100b) that have respective normals intersecting with each other and that are continuous, first patch antennas (10a to 10d) that are formed on the first flat plate portion (100a) and second patch antennas (20a to 20d) that are formed on the second flat plate portion (100b). The first patch antennas (10a to 10d) are arranged in at least a column in a column direction parallel to a boundary line (B) between the first flat plate portion (100a) and the second flat plate portion (100b). The second patch antennas (20a to 20d) are arranged in at least a column in the column direction.

22 Claims, 14 Drawing Sheets

(51) Int. Cl.
*H01Q 9/04* (2006.01)
*H01Q 21/00* (2006.01)
*H01Q 21/24* (2006.01)
*H04B 1/18* (2006.01)

(58) Field of Classification Search
CPC .......... H01Q 21/065; H04B 1/18; H04B 7/00; H04B 7/02; H04B 7/04
See application file for complete search history.

(56) References Cited

U.S. PATENT DOCUMENTS

| | | | |
|---|---|---|---|
| 6,456,242 B1* | 9/2002 | Crawford ............ | H01Q 1/2258 |
| | | | 343/700 MS |
| 2002/0122006 A1 | 9/2002 | Crawford | |
| 2013/0050056 A1* | 2/2013 | Lee .................... | H01Q 9/0407 |
| | | | 343/893 |
| 2013/0147664 A1 | 6/2013 | Lin | |
| 2013/0257668 A1* | 10/2013 | Rao ........................ | H01Q 1/40 |
| | | | 343/767 |
| 2017/0062908 A1* | 3/2017 | Sanderovich ........ | H01Q 21/065 |
| 2018/0151947 A1* | 5/2018 | Apostolos ............. | H01Q 21/28 |

FOREIGN PATENT DOCUMENTS

| | | |
|---|---|---|
| JP | 2015-97338 A | 5/2015 |
| JP | 2016-27708 A | 2/2016 |

OTHER PUBLICATIONS

Written Opinion for International Application No. PCT/JP2018/022090 dated Sep. 11, 2018.

\* cited by examiner

NORMAL PATCH ANTENNA
(FULL PATCH ANTENNA)

HALF PATCH ANTENNA
(ONE-SIDE-SHORT-CIRCUIT MICROSTRIP ANTENNA)

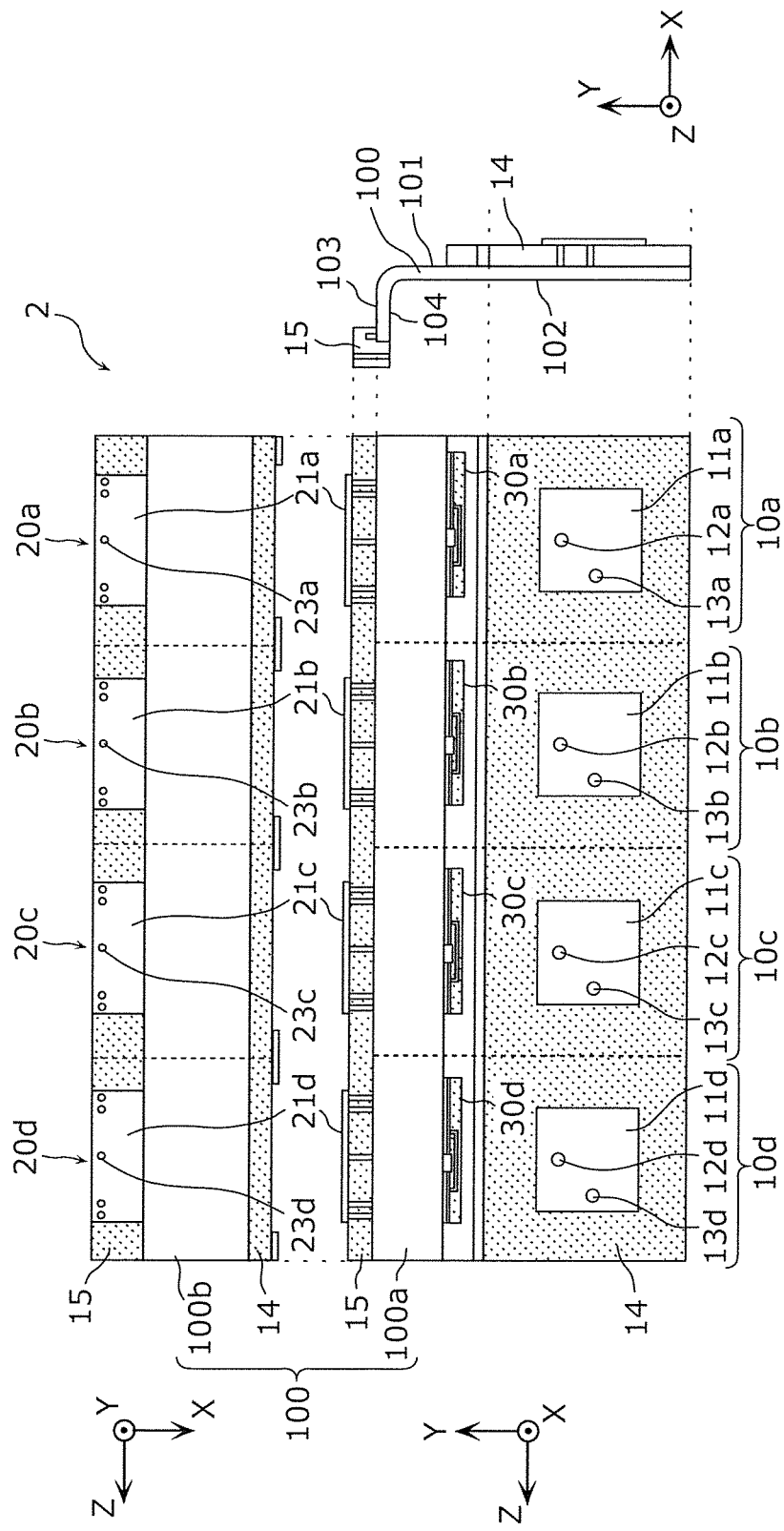

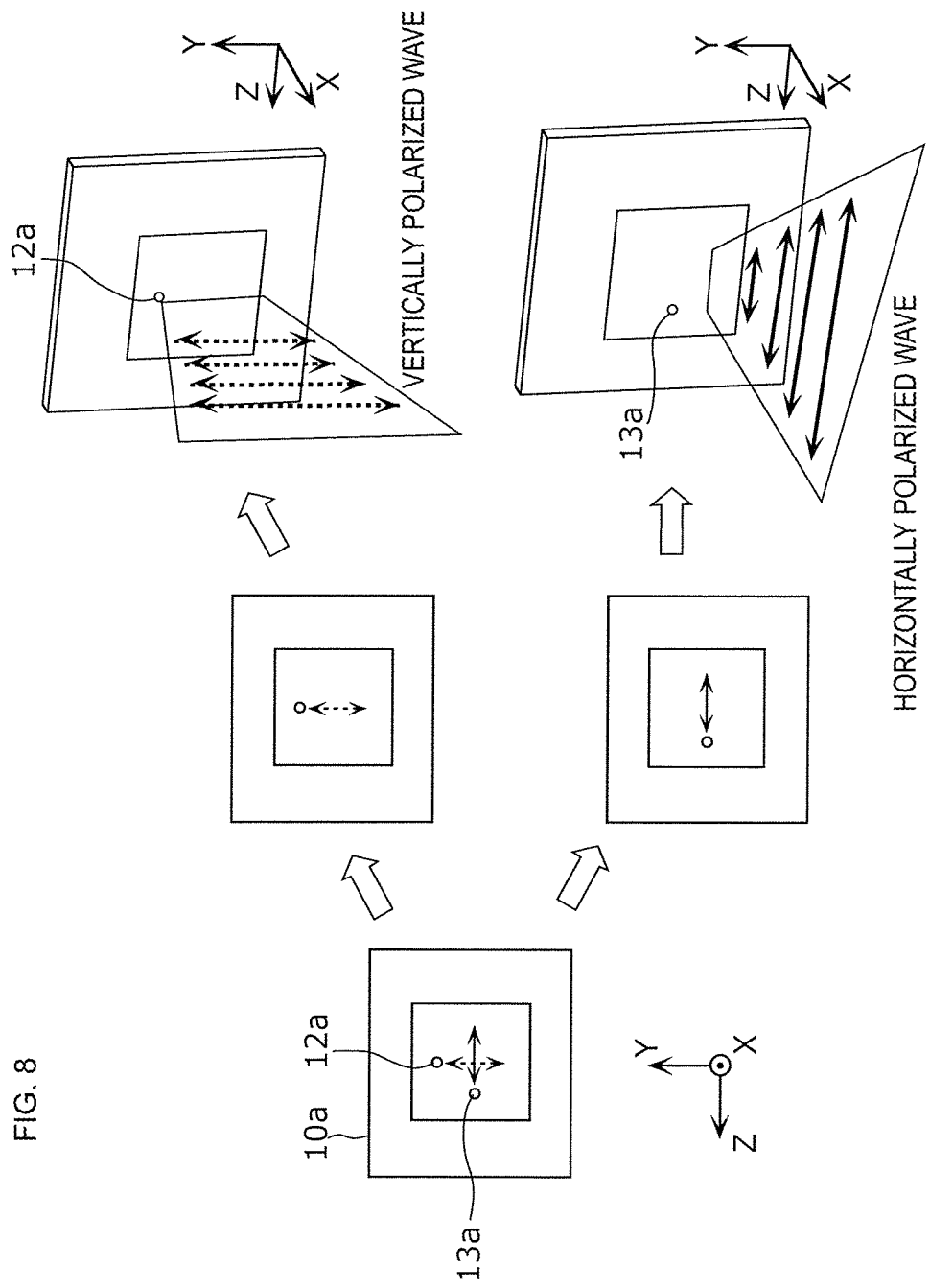

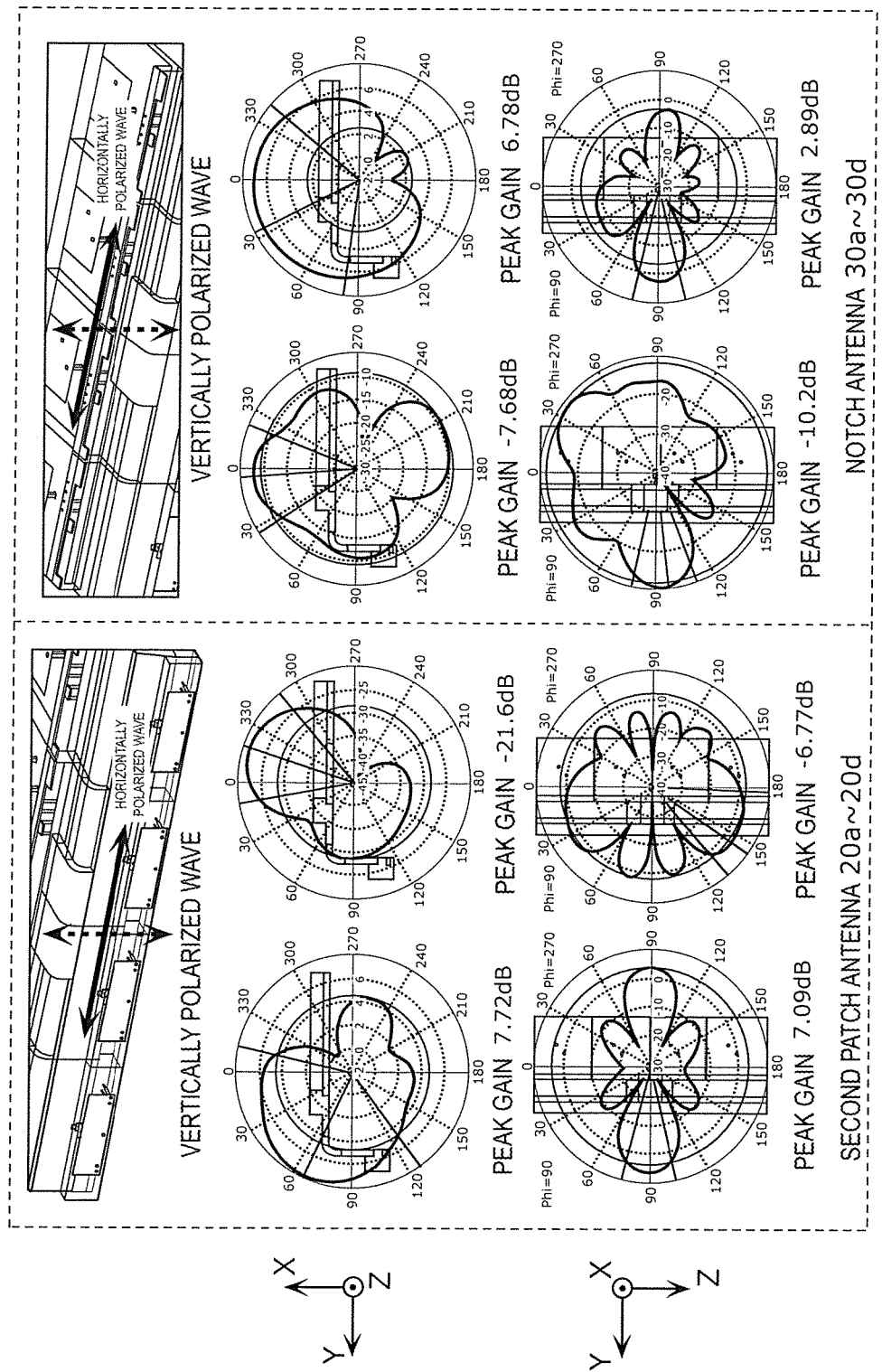

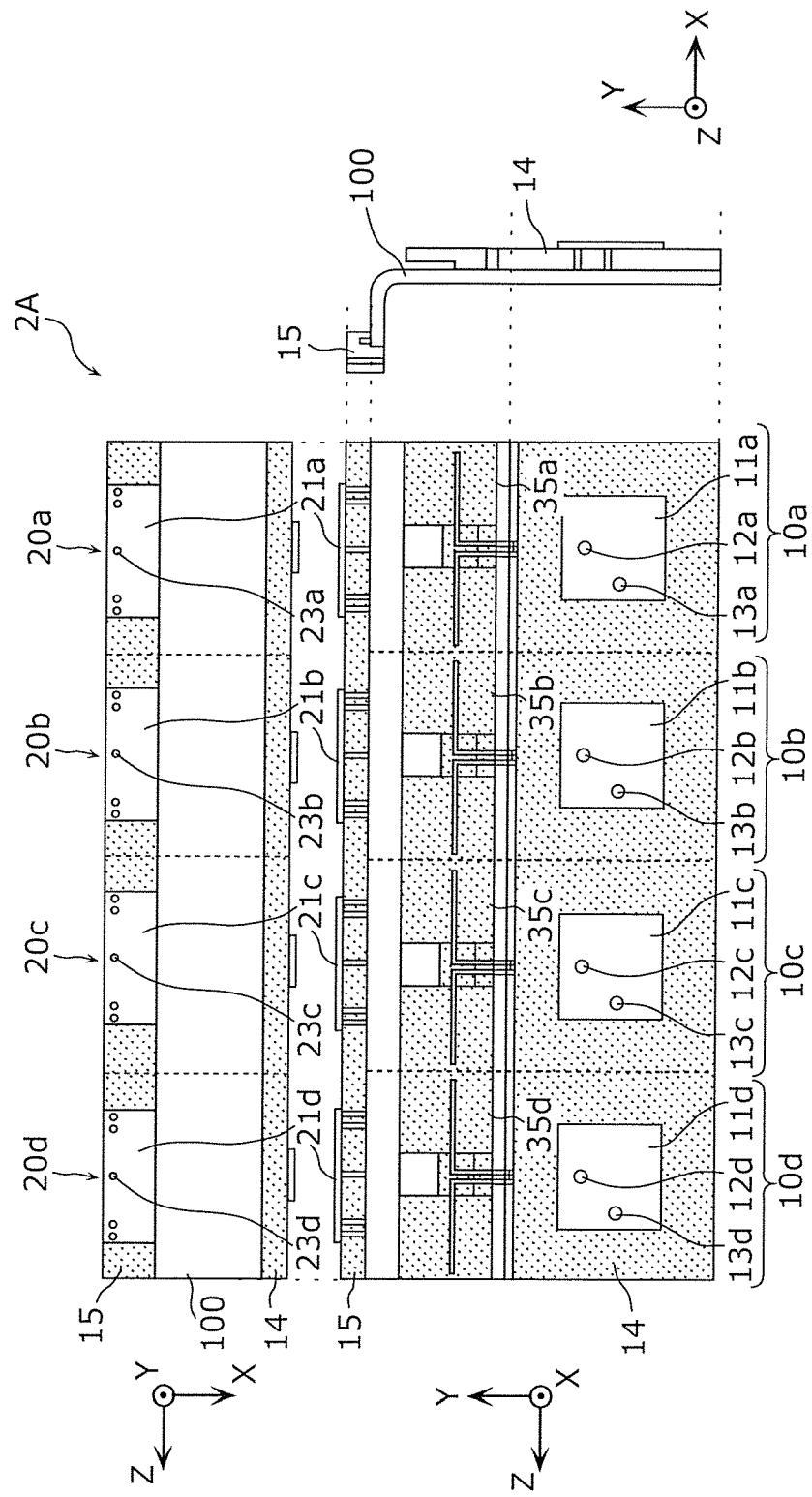

FIG. 13A
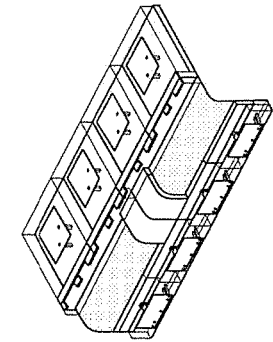
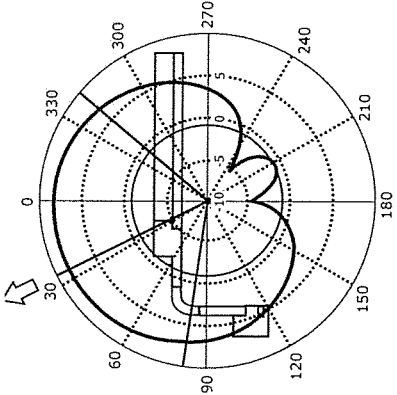
THERE IS NO SUBSTRATE IN FRONT OF NOTCH ANTENNAS
PEAK GAIN 7.31dB
⇕
FIG. 13B
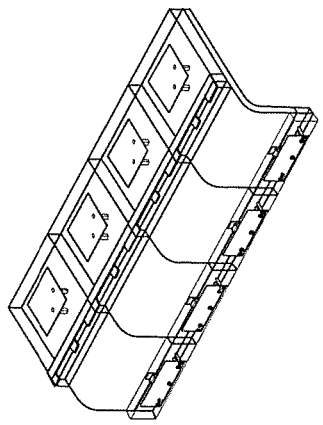
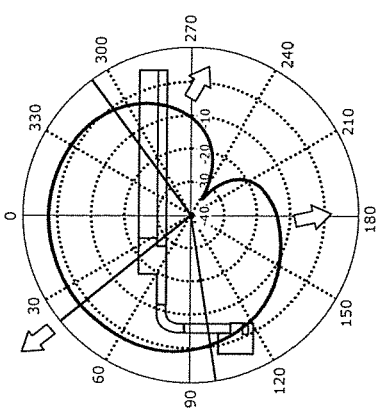
THERE IS SUBSTRATE IN FRONT OF NOTCH ANTENNAS
PEAK GAIN 2.17dB
⇕
FIG. 13C
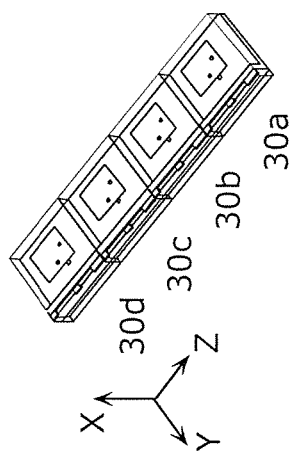
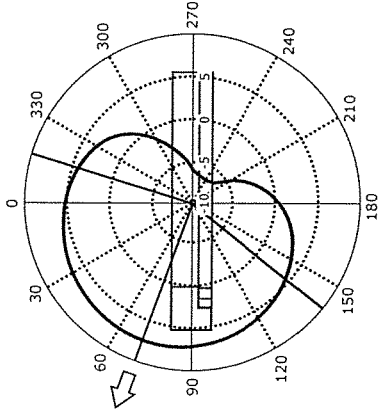
GROUND ELECTRODE LAYERS ARE DECREASED
PEAK GAIN 6.78dB

ANTENNA MODULE AND COMMUNICATION DEVICE

This is a continuation of International Application No. PCT/JP2018/022090 filed on Jun. 8, 2018 which claims priority from Japanese Patent Application No. 2017-117242 filed on Jun. 14, 2017. The contents of these applications are incorporated herein by reference in their entireties.

BACKGROUND OF THE DISCLOSURE

Field of the Disclosure

The present disclosure relates to an antenna module and a communication device.

Description of the Related Art

The structure of a 3D antenna system that includes patch antennas that serve as array antennas for wireless communication and that are arranged on two different flat surfaces is disclosed (see, for example, Patent Document 1). With this structure, directivity can have plural values, and the coverage of antenna radiation and reception can be improved.
Patent Document 1: Japanese Unexamined Patent Application Publication (Translation of PCT Application) No. 2014-529971

BRIEF SUMMARY OF THE DISCLOSURE

For the 3D antenna system disclosed in Patent Document 1, however, the form of each antenna that is disposed on the two different flat surfaces is selected depending on various antenna performances. For this reason, in the case where the form of the antenna is selected such that priority is placed on antenna characteristics, and the 3D antenna system is mounted on a side surface of a communication device, there is a problem in that decrease in the thickness of the communication device is restricted because of the size of the antenna. For example, in a communication device such as a cellular phone that requires the reduced thickness, one flat surface is located so as to be along a main surface of a mounting substrate (or a housing) of the communication device, and the other flat surface is located so as to be along a side surface of an end portion of the mounting substrate (or the housing) in order to improve the antenna characteristics such as the coverage of antenna radiation and reception. In this case, the decrease in the thickness of the communication device is restricted because of the size of the other flat surface.

The present disclosure has been accomplished to solve the above problems, and it is an object of the present disclosure to provide an antenna module that has improved antenna characteristics and enables the thickness of a communication device on which the antenna module is disposed to be decreased, and the communication device.

To achieve the above object, an antenna module according to an aspect of the present disclosure includes a substrate including a first flat plate portion and a second flat plate portion that have respective normals intersecting each other and that are continuous, one or more first patch antennas that are formed on the first flat plate portion, and one or more second patch antennas that are formed on the second flat plate portion. The one or more first patch antennas are arranged in at least a column in a column direction parallel to a boundary line between the first flat plate portion and the second flat plate portion, wherein the one or more second patch antennas are arranged in at least a column in the column direction. A size, in a second direction, of a second patch antenna of the one or more second patch antennas that is arranged in a column located farthest from the boundary line is smaller than a size, in a first direction, of the one or more first patch antennas, where the second direction is perpendicular to the column direction and parallel to a main surface of the second flat plate portion, and the first direction is perpendicular to the column direction and parallel to a main surface of the first flat plate portion.

With the above structure, since the size, in the second direction, of the second patch antenna that is arranged in the outermost column of the second flat plate portion is smaller than the size, in the first direction, of the one or more first patch antennas, the width of the second flat plate portion (in the direction perpendicular to the boundary line) can be less than that in an antenna module in which each of patch antennas includes the first patch antenna. Consequently, the first flat plate portion can be disposed parallel to a main surface of a housing of a communication device that requires the reduced thickness, and the second flat plate portion can be disposed parallel to a side surface of the housing. Since the first flat plate portion and the second flat plate portion are not disposed on the same flat surface, antenna characteristics having plural values of directivity can be achieved. Accordingly, the antenna characteristics can be improved, and the thickness of the communication device on which the antenna module is disposed can be decreased.

The second patch antenna that is arranged in the column located farthest from the boundary line may be a one-side-short-circuit microstrip antenna.

In this case, the second patch antenna that is arranged in the outermost column of the second flat plate portion includes the one-side-short-circuit microstrip antenna. For this reason, the width of the second flat plate portion (in the direction perpendicular to the boundary line) can be less than that in an antenna module in which each of patch antennas includes a normal patch antenna. Consequently, the first flat plate portion can be disposed parallel to a main surface of a housing of a communication device that requires the reduced thickness, and the second flat plate portion can be disposed parallel to a side surface of the housing. Since the first flat plate portion and the second flat plate portion are not disposed on the same flat surface, antenna characteristics having plural values of directivity can be achieved. Accordingly, the antenna characteristics can be improved, and the thickness of the communication device on which the antenna module is disposed can be decreased.

The second patch antenna that is arranged in the column located farthest from the boundary line may include a radiation electrode that radiates or receives a radio frequency signal, a ground electrode that is formed in the second flat plate portion or on the second flat plate portion, a ground via conductor that connects a short circuit point located at an end of the radiation electrode and the ground electrode to each other, and a feed via conductor that connects a feed point and a transmission line that is formed in the second flat plate portion or on the second flat plate portion to each other, the radio frequency signal being fed to the radiation electrode through the transmission line.

In this case, the second patch antenna that is arranged in the outermost column of the second flat plate portion can be a so-called inverted-F patch antenna.

The second patch antenna that is arranged in the column located farthest from the boundary line may include a dielectric layer that is formed between the radiation electrode and the ground electrode. A distance between the radiation electrode and the ground electrode in a region near the ground via conductor may be longer than a distance between the radiation electrode and the ground electrode in a region near the feed via conductor.

With the above structure, it is not necessary for the transmission line to be connected to the radiation electrode near the ground via conductor farther than the feed via conductor to the boundary line. For this reason, among ground layers, a ground layer for surrounding the transmission line can be removed near the ground via conductor. This enables the distance between the radiation electrode and the ground electrode in the region near the ground via conductor to be longer than the distance between the radiation electrode and the ground electrode in the region near the feed via conductor. In other words, the thickness of the dielectric layer in the region near the ground via conductor can be more than the thickness of the dielectric layer in the region near the feed via conductor. Accordingly, the band width of the one-side-short-circuit microstrip antenna can be increased.

The first flat plate portion may have a first main surface and a second main surface that face away from each other. The second flat plate portion may have a third main surface and a fourth main surface that face away from each other. The first main surface and the third main surface may be continuous, and the second main surface and the fourth main surface may be continuous. The one or more first patch antennas may be disposed near the first main surface of the first main surface and the second main surface. The one or more second patch antennas may be disposed near the third main surface of the third main surface and the fourth main surface. The antenna module further may include one or more notch antennas or one or more dipole antennas that are disposed between the one or more first patch antennas and the one or more second patch antennas. The one or more first patch antennas may form a first polarized wave and a second polarized wave that differs from the first polarized wave. The one or more second patch antennas may form a third polarized wave. The one or more notch antennas or the one or more dipole antennas may form a fourth polarized wave that differs from the third polarized wave. The first polarized wave and the second polarized wave may have directivity in a direction perpendicular to the first flat plate portion. The third polarized wave and the fourth polarized wave may have directivity in a direction perpendicular to the second flat plate portion.

Among the patch antennas, the one-side-short-circuit microstrip antenna is limited by the formation of a polarized wave in one direction. In the case of a normal patch antenna instead of the one-side-short-circuit microstrip antenna, two kinds of polarized waves can be formed by providing the single radiation electrode with plural feed points.

With the above structure, the one or more notch antennas or the one or more dipole antennas are disposed near the one or more second patch antennas. Accordingly, not only the first polarized wave is formed by the one or more second patch antennas in the radiation direction of the one or more second patch antennas, but also the second polarized wave that differs from the first polarized wave can be formed by the one or more notch antennas or the one or more dipole antennas. Accordingly, the antenna module can be a so-called dual-polarized-wave antenna module with respect to both of the radiation direction of the one or more first patch antennas and the radiation direction of the one or more second patch antennas.

The one or more notch antennas or the one or more dipole antennas may be disposed on the first main surface.

In this case, the one or more notch antennas or the one or more dipole antennas are disposed near the one or more second patch antennas but disposed on the first flat plate portion. Accordingly, the width of the second flat plate portion is not greatly changed due to the arrangement of the one or more notch antennas or the one or more dipole antennas. Accordingly, the antenna module can be the dual-polarized-wave antenna module, and the thickness of the communication device on which the antenna module is disposed can be decreased.

The first flat plate portion may have a first main surface and a second main surface that face away from each other. The second flat plate portion may have a third main surface and a fourth main surface that face away from each other. The first main surface and the third main surface may be continuous, and the second main surface and the fourth main surface may be continuous. The one or more first patch antennas may be disposed near the first main surface of the first main surface and the second main surface. The one or more second patch antennas may be disposed near the third main surface of the third main surface and the fourth main surface. The antenna module may further include one or more one-side-short-circuit microstrip antennas that are formed on the first flat plate portion between the one or more first patch antennas and the one or more second patch antennas. The one or more first patch antennas may form a first polarized wave and a second polarized wave that differs from the first polarized wave. The one or more second patch antennas may form a third polarized wave and a fourth polarized wave that differs from the third polarized wave. The first polarized wave and the second polarized wave may have directivity in a direction perpendicular to the first flat plate portion. The third polarized wave and the fourth polarized wave may have directivity in a direction perpendicular to the second flat plate portion.

With the above structure, since the one or more first patch antennas form the first polarized wave and the second polarized wave that have directivity in the direction perpendicular to the first flat plate portion, and the one or more second patch antennas form the third polarized wave and the fourth polarized wave that have directivity in the direction perpendicular to the second flat plate portion, the antenna module can be the so-called dual-polarized-wave antenna module with respect to both of the radiation direction of the one or more first patch antennas and the radiation direction of the one or more second patch antennas.

An angle that is formed between a polarization direction of the first polarized wave and a polarization direction of the second polarized wave may be about 90 degrees.

In this case, the isolation between the two polarized waves that are formed by the one or more first patch antennas can be optimized.

An angle that is formed between a polarization direction of the third polarized wave and a polarization direction of the fourth polarized wave may be about 90 degrees.

In this case, the isolation between the one-side-short-circuit microstrip antenna of the one or more second patch antennas and the one or more notch antennas or the one or more dipole antennas can be optimized.

The antenna module may further include a radio frequency integrated circuit that is disposed on a surface of the first flat plate portion opposite to a surface on which the one or more first patch antennas are formed and that performs a signal processing of a transmission system for outputting, to the one or more first patch antennas and the one or more second patch antennas, a signal that is received from a base band integrated circuit and that is up-converted, or a signal processing of a reception system for outputting, to the base band integrated circuit, a radio frequency signal that is received from the one or more first patch antennas and the one or more second patch antennas and that is down-converted, or both.

In this case, the one or more first patch antennas and the radio frequency integrated circuit can be disposed with the first flat plate portion interposed therebetween. Accordingly, the length of a transmission line that connects the radio frequency integrated circuit and the one or more first patch antennas to each other can be decreased. Also, in this case, the one or more second patch antennas and the radio frequency integrated circuit can be disposed with the second flat plate portion interposed therebetween. Accordingly, the length of a transmission line that connects the radio frequency integrated circuit and the one or more second patch antennas to each other can be decreased. Consequently, the loss of transmission of the radio frequency signal can be reduced.

A communication device according to an aspect of the present disclosure includes the above antenna module, the base band integrated circuit, and a mounting substrate on which the base band integrated circuit and the radio frequency integrated circuit are mounted. The main surface of the first flat plate portion faces a main surface of the mounting substrate. The main surface of the second flat plate portion faces a side surface of an end portion of the mounting substrate.

With the above structure, the width of the second flat plate portion of the antenna module is decreased, and the second flat plate portion is disposed parallel to a side surface of an end portion of a mounting substrate (or a housing) of the communication device. Accordingly, the antenna characteristics can be improved, and the thickness of the communication device can be decreased.

An antenna module and a communication device according to the present disclosure have improved antenna characteristics and enable the thickness of the communication device on which the antenna module is disposed to be decreased.

BRIEF DESCRIPTION OF THE SEVERAL VIEWS OF THE DRAWINGS

FIG. 7 illustrates three views of the shape of an antenna module according to a second embodiment.

FIG. 8 illustrates the polarization direction of a first patch antenna.

FIG. 10 illustrates graphs of antenna radiation patterns of the second patch antennas and the notch antennas.

FIG. 11 illustrates three views of the shape of an antenna module according to a modification to the second embodiment.

FIGS. 13A, 13B and 13C illustrate the comparison between the antenna radiation patterns of the notch antennas with different structures of the ground electrode.

DETAILED DESCRIPTION OF THE DISCLOSURE

Figure 1:
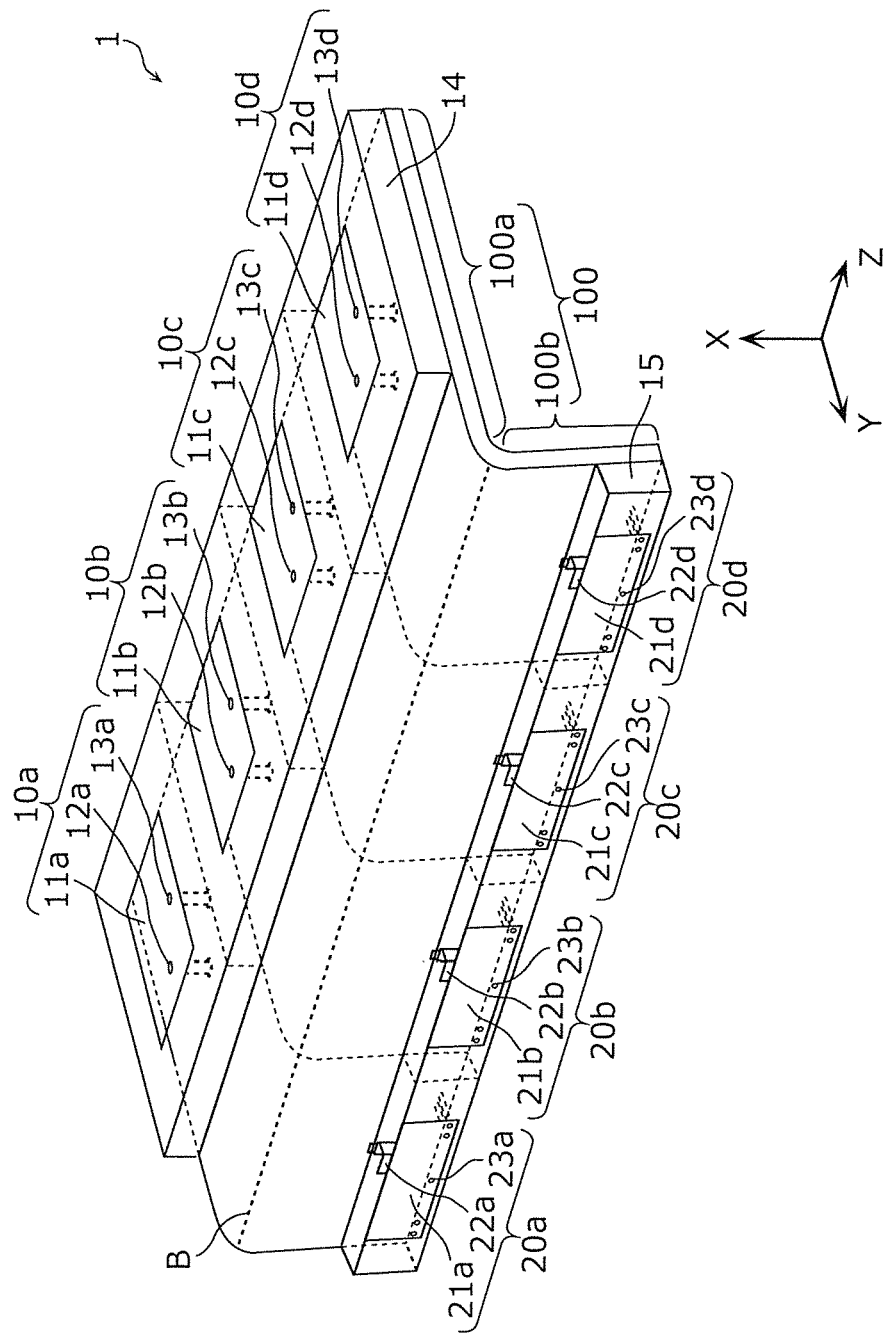
FIG. 1 is a perspective view of the appearance of an antenna module according to a first embodiment.

Embodiments of the present disclosure will hereinafter be described in detail with reference to the drawings. Each embodiment described below is a comprehensive or specific example. In the following embodiments, numerical values, shapes, materials, components, and the arrangement and connection form of the components, for example, are described by way of example and do not limit the present disclosure. Among the components according to the embodiments below, components that are not recited in the independent claim are described as optional components. The size of each component illustrated in the drawings or the ratio of the size is not necessarily illustrated strictly. In the drawings, substantially the same components are designated by like reference characters, and a duplicated description is omitted or simplified in some cases.

First Embodiment

[1.1 Structure of Antenna Module]

Figure 2:
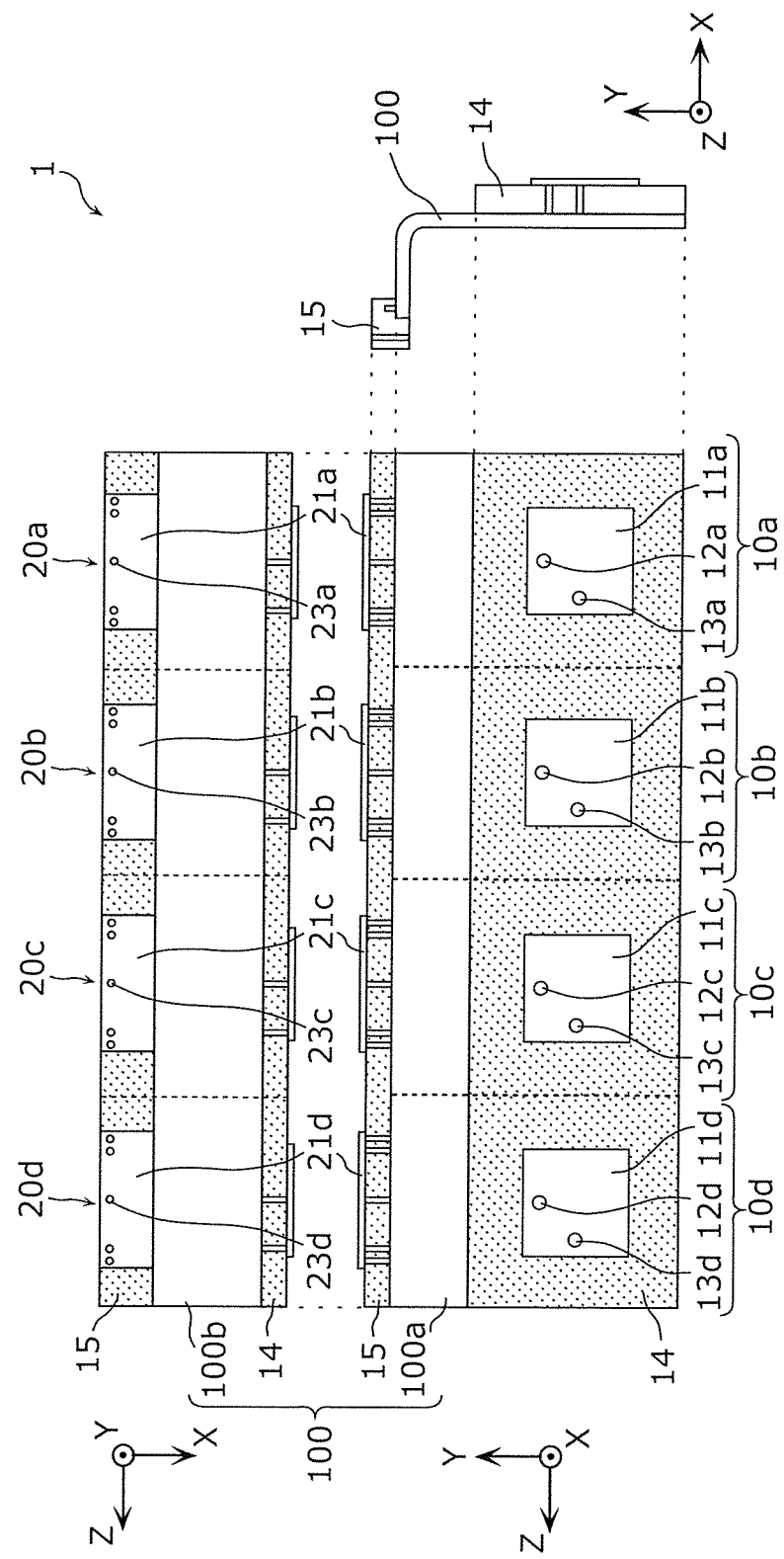
FIG. 2 illustrates three views of the shape of the antenna module according to the first embodiment.

FIG. 1 is a perspective view of the appearance of an antenna module 1 according to a first embodiment. FIG. 2 illustrates three views (a front view, a plan view, and a side view) of the shape of the antenna module 1 according to the first embodiment.

As illustrated in FIG. 1, the antenna module 1 according to the present embodiment includes a substrate 100, first patch antennas 10a, 10b, 10c, and 10d, and second patch antennas 20a, 20b, 20c, and 20d.

The substrate 100 includes a first flat plate portion 100a and a second flat plate portion 100b that have respective normals intersecting with each other and that are continuous. According to the present embodiment, the substrate 100 has an L-shape in which the first flat plate portion 100a and the second flat plate portion 100b are folded about 90 degrees along a boundary line B.

The first patch antennas 10a to 10d are formed on the first flat plate portion 100a and arranged in a column in a column direction (Z-axis direction in FIG. 1) parallel to the boundary line B. The first patch antenna 10a includes a radiation electrode 11a, feed via conductors 12a and 13a, and a dielectric layer 14. The first patch antenna 10b includes a radiation electrode 11b, feed via conductors 12b and 13b, and the dielectric layer 14. The first patch antenna 10c includes a radiation electrode 11c, feed via conductors 12c and 13c, and the dielectric layer 14. The first patch antenna 10d includes a radiation electrode 11d, feed via conductors 12d and 13d, and the dielectric layer 14.

The second patch antennas 20a to 20d are formed on the second flat plate portion 100b and arranged in a column in the column direction (Z-axis direction in FIG. 1) parallel to the boundary line B. The second patch antenna 20a includes a radiation electrode 21a, a feed via conductor 22a, a ground via conductor 23a, and a dielectric layer 15. The second patch antenna 20b includes a radiation electrode 21b, a feed via conductor 22b, a ground via conductor 23b, and the dielectric layer 15. The second patch antenna 20c includes a radiation electrode 21c, a feed via conductor 22c, a ground via conductor 23c, and the dielectric layer 15. The second patch antenna 20d includes a radiation electrode 21d, a feed via conductor 22d, a ground via conductor 23d, and the dielectric layer 15.

The structure of the first patch antennas 10a to 10d and the second patch antennas 20a to 20d will now be described with reference to FIG. 3A, FIG. 3B, and FIG. 4.

Figure 3A:
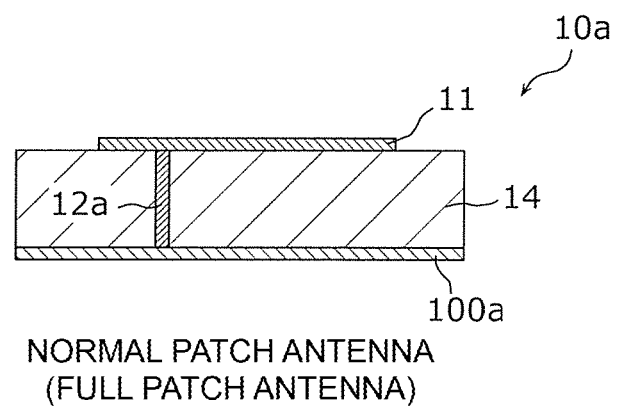
FIG. 3A is a sectional view of the structure of a normal (full) patch antenna.
Figure 4:
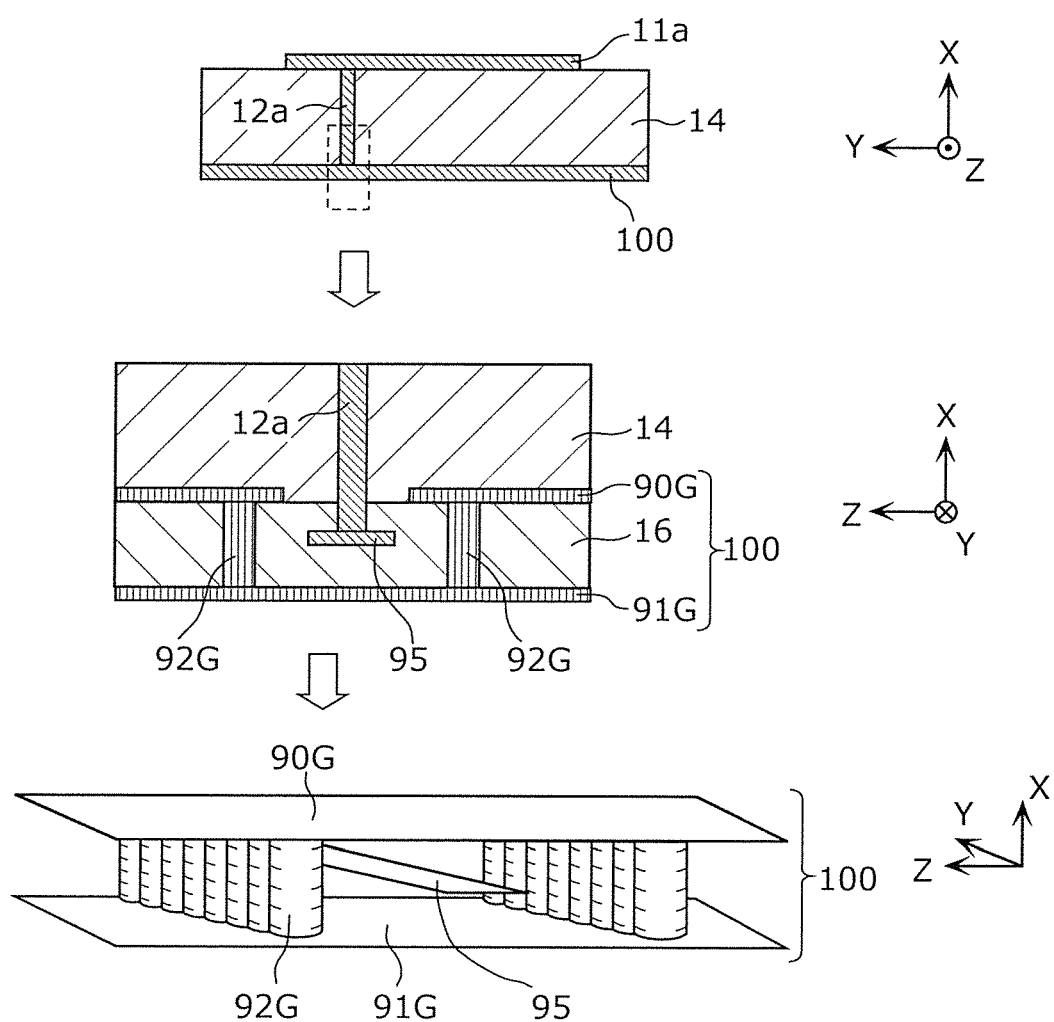
FIG. 4 illustrates a sectional structure of a patch antenna and the structure of a transmission line layer.

FIG. 3A is a sectional view of the structure of a normal (full) patch antenna. FIG. 4 illustrates a sectional structure of the first patch antenna 10a and the structure of a transmission line layer. The normal (full) patch antenna illustrated in FIG. 3A includes a radiation electrode and a ground electrode that face each other with a dielectric layer interposed therebetween, and a feed line that connects the radiation electrode and a transmission line to each other. Each of the first patch antennas 10a to 10d includes the normal (full) patch antenna illustrated in FIG. 3A.

As illustrated in FIG. 3A, the first patch antenna 10a includes the dielectric layer 14 that is disposed on the first flat plate portion 100a, the radiation electrode 11a that is disposed on the dielectric layer 14, and the feed via conductors 12a and 13a (not illustrated). As illustrated at the middle in FIG. 4, the transmission line layer for transmitting a radio frequency signal is formed in the first flat plate portion 100a. The transmission line layer includes a transmission line 95, a ground via conductor 92G, ground electrode layers 90G and 91G, and a dielectric layer 16. The transmission line 95 connects the feed via conductor 12a (or 13a) and a radio frequency integrated circuit (not illustrated) to each other. The ground via conductor 92G connects the ground electrode layer 90G that is disposed as an upper part of the transmission line layer and the ground electrode layers 91G that is disposed as a lower part of the transmission line layer to each other. As illustrated at the bottom in FIG. 4, the transmission line 95 is surrounded by the ground via conductor 92G, and the ground electrode layers 90G and 91G. With this structure, the transmission line 95 can transmit the radio frequency signal with a low loss. The dielectric layer 14 and the dielectric layer 16 may be composed of the same material or may be composed of different materials.

The above structure of the first patch antenna 10a enables antenna gain to be obtained at least in the direction perpendicular to the radiation electrode 11a. The feed via conductors 12a and 13a (feed points) that are eccentric from the center of the radiation electrode 11a in directions perpendicular to each other enable two different polarized waves to be generated.

The first patch antennas 10b to 10d have the same sectional structure as the first patch antenna 10a. Accordingly, the first patch antennas 10a to 10d can provide antenna characteristics of dual polarized waves.

Examples of the substrate 100 in which the transmission line layer is formed include a printed circuit board or a low temperature co-fired ceramics (LTCC) substrate in which a metal conductor layer and a metal conductor via are formed by patterning. The substrate 100 may be a flexible substrate such that the first flat plate portion 100a and the second flat plate portion 100b can be readily folded.

Figure 3B:
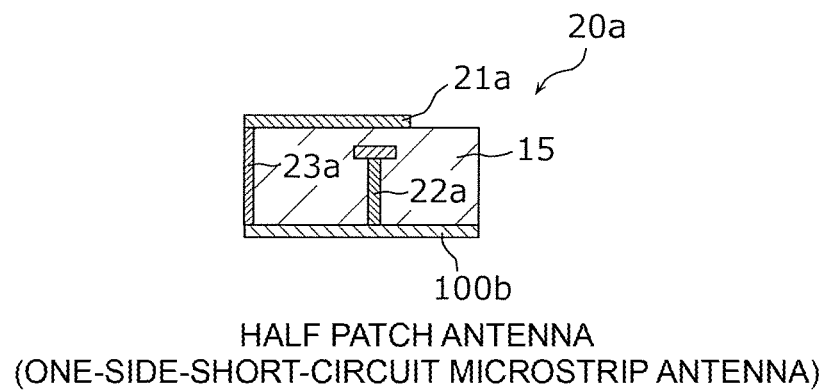
FIG. 3B is a sectional view of the structure of a one-side-short-circuit microstrip (half patch) antenna.

FIG. 3B is a sectional view of the structure of a one-side-short-circuit microstrip (half patch) antenna. Each of the second patch antennas 20a to 20d includes the one-side-short-circuit microstrip (half patch) antenna illustrated in FIG. 3B. The one-side-short-circuit microstrip (half patch) antenna illustrated in FIG. 3B includes a radiation electrode and a ground electrode that face each other with a dielectric layer interposed therebetween, and a short-circuit line that connects an end of the radiation electrode and the ground electrode, and a feed line through which a radio frequency signal is fed to the radiation electrode.

As illustrated in FIG. 3B, the second patch antenna 20a includes the dielectric layer 15 that is disposed on the second flat plate portion 100b, the radiation electrode 21a that is disposed on the dielectric layer 15, the feed via conductor 22a, and the ground via conductor 23a. A transmission line layer for transmitting the radio frequency signal is formed in the second flat plate portion 100b as in the first flat plate portion 100a. The transmission line layer includes the transmission line 95, the ground via conductor 92G, the ground electrode layers 90G and 91G, and the dielectric layer 16. The transmission line 95 of the second patch antenna 20a connects the feed via conductor 22a and the radio frequency integrated circuit to each other. The ground via conductor 23a connects an end of the radiation electrode 21a and the ground electrode layer 90G or 91G to each other. The dielectric layer 15 and the dielectric layer 16 may be composed of the same material or may be composed of different materials. The above structure of the second patch antenna 20a enables antenna gain to be obtained at least in the direction perpendicular to the radiation electrode 21a.

According to the present embodiment, capacitance coupling occurs between the feed via conductor 22a and the radiation electrode 21a. The capacitance coupling between the feed via conductor 22a and the radiation electrode 21a enables (1) the degree of freedom of addition of capacitance to be increased. Accordingly, impedance matching can be achieved without a matching circuit. In addition, (2) feed is available from the other end of the radiation electrode, at which the electric field of the half patch antenna is the maximum. Accordingly, the length of the transmission line 95 to the feed point can be decreased. This enables the ground electrode layers, which do not need for the transmission line 95, to recede and enables the volume of the dielectric layer to be increased.

The second patch antennas 20b to 20d have the same sectional structure as the second patch antenna 20a.

The ground electrode layers 90G and 91G continuously extend from the first flat plate portion 100a to the second flat plate portion 100b. This enables a communication device that includes the antenna module 1 to shield a folded portion of the substrate of the antenna module 1. One of the ground electrode layers 90G and 91G may be discontinuous between the first flat plate portion 100a and the second flat plate portion 100b.

As seen from the comparison between the sectional structures in FIG. 3A and FIG. 3B, the size of the one-side-short-circuit microstrip antenna in the direction in which the feed via conductor 22a and the ground via conductor 23a are arranged can be equal to or less than substantially half of that of the normal patch antenna. More specifically, the size of the ground electrode layers 90G and 91G of the second flat plate portion 100b, the radiation electrode 21a, the dielectric layer 15, and the transmission line layer in the above direction can be smaller than λ/2, which is a frequency that is used.

As illustrated in FIG. 1 and FIG. 2, each of the second patch antennas 20a to 20d of the antenna module 1 according to the present embodiment is a one-side-short-circuit microstrip antenna in which the long sides of the radiation electrodes 21a to 21d that have a rectangular shape are parallel to the boundary line B. Each of the second patch antennas 20a to 20d is formed such that the boundary line B, and the feed via conductor 22a (feed point) and the ground via conductor 23a (short circuit point) of the one-side-short-circuit microstrip antenna are arranged in this order.

With the above structure, the width of the second flat plate portion 100b (in the direction perpendicular to the boundary line B) can be less than that in an antenna module in which each of patch antennas that are formed on the second flat plate portion 100b includes the normal patch antenna. Consequently, the first flat plate portion 100a can be disposed parallel to a main surface of a housing of, for example, a cellular phone (communication device) that requires the reduced thickness, and the second flat plate portion 100b can be disposed parallel to a side surface of the housing. Since the first flat plate portion 100a and the second flat plate portion 100b are not disposed on the same flat surface, antenna characteristics having plural values of directivity can be achieved. Accordingly, the antenna characteristics such as the coverage of antenna radiation and reception can be improved, and the thickness of the communication device on which the antenna module is disposed can be decreased.

The first patch antennas 10a to 10d are not limited to one column arrangement in the column direction but may be arranged in two or more columns in the column direction. The second patch antennas 20a to 20d are not limited to one column arrangement but may be arranged in two or more columns in the column direction.

[1.2 Structure of Antenna Module According to First Modification]

Figure 5A:
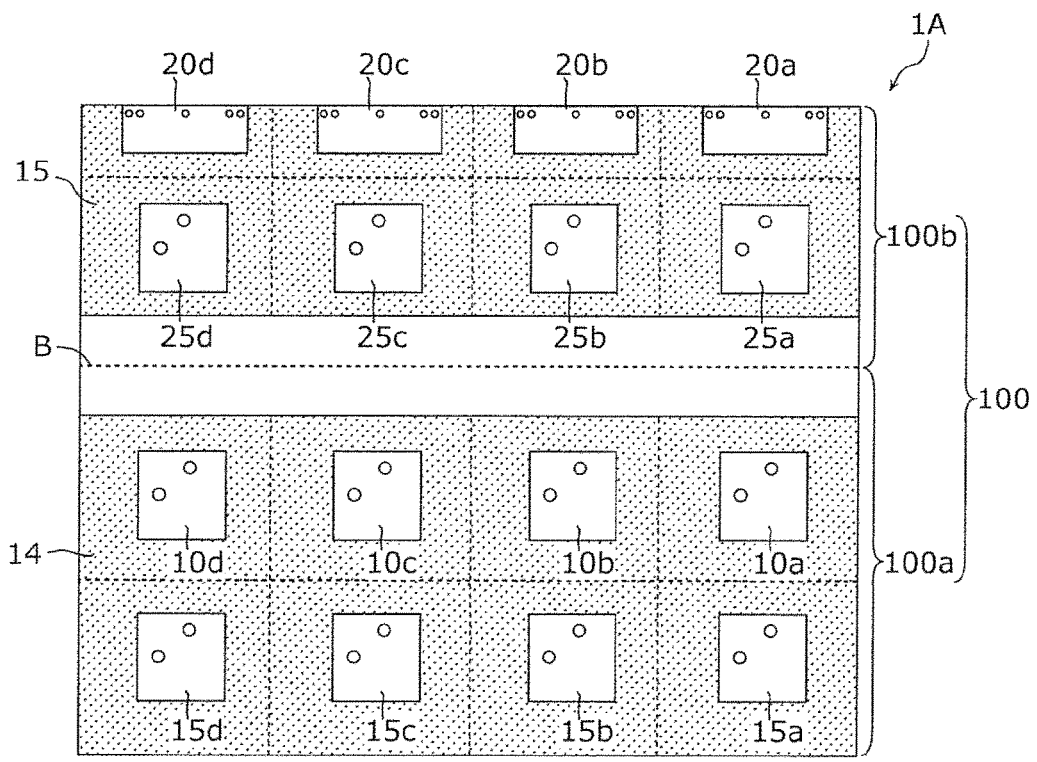
FIG. 5A illustrates an orthographic projection of an antenna module according to a first modification to the first embodiment.

FIG. 5A illustrates an orthographic projection of an antenna module 1A according to a first modification to the first embodiment. In the antenna module 1A according to the present modification, the first flat plate portion 100a and the second flat plate portion 100b are folded about 90 degrees along the boundary line B, and an L-shape is formed as in the antenna module 1. For conciseness of the structure, however, FIG. 5A illustrates the substrate 100 unfolded on a plane.

The antenna module 1A according to the present modification differs from the antenna module 1 according to the first embodiment in that the first patch antennas are arranged in two columns, and the second patch antennas are arranged in two columns. Differences between the antenna module 1A according to the present modification and the antenna module 1 according to the first embodiment will be mainly described, and the same subject matters are omitted.

As illustrated in FIG. 5A, the antenna module 1A according to the present modification includes the substrate 100, the first patch antennas 10a, 10b, 10c, and 10d, first patch antennas 15a, 15b, 15c, and 15d, the second patch antennas 20a, 20b, 20c, and 20d, second patch antennas 25a, 25b, 25c, and 25d.

The substrate 100 includes the first flat plate portion 100a and the second flat plate portion 100b that have respective normals intersecting with each other and that are continuous. According to the present modification, the substrate 100 has an L-shape in which the first flat plate portion 100a and the second flat plate portion 100b are folded about 90 degrees along the boundary line B.

The first patch antennas 10a to 10d and 15a to 15d are formed on the first flat plate portion 100a and arranged in two columns in the column direction (Z-axis direction in FIG. 1) parallel to the boundary line B.

The second patch antennas 20a to 20d and 25a to 25d are formed on the second flat plate portion 100b and arranged in two columns in the column direction (Z-axis direction in FIG. 1) parallel to the boundary line B.

Each of the first patch antennas 10a to 10d and 15a to 15d includes the normal (full) patch antenna illustrated in FIG. 3A.

Each of the second patch antennas 25a to 25d includes the normal (full) patch antenna illustrated in FIG. 3A.

Among the second patch antennas 20a to 20d and 25a to 25d, each of the second patch antennas 20a to 20d that are arranged in the column located farthest from the boundary line B includes the one-side-short-circuit microstrip (half patch) antenna illustrated in FIG. 3B.

In the antenna module 1A according to the present modification, each of the second patch antennas 20a to 20d that are arranged in the outermost column of the second flat plate portion 100b is formed such that the boundary line B, and the feed via conductor 22a (feed point) and the ground via conductor 23a (short circuit point) of the one-side-short-circuit microstrip antenna are arranged in this order.

With the above structure, the width of the second flat plate portion 100b (in the direction perpendicular to the boundary line B) can be less than that in an antenna module in which each of patch antennas that are formed on the second flat plate portion 100b includes the normal patch antenna. Consequently, the first flat plate portion 100a can be disposed parallel to a main surface of a housing of, for example, a cellular phone (communication device) that requires the reduced thickness, and the second flat plate portion 100b can be disposed parallel to a side surface of the housing. Since the first flat plate portion 100a and the second flat plate portion 100b are not disposed on the same flat surface, the antenna characteristics having plural values of directivity can be achieved. Accordingly, the antenna characteristics such as the coverage of antenna radiation and reception can be improved, and the thickness of the communication device on which the antenna module is disposed can be decreased.

In addition, the patch antennas that are arranged in columns enable directivity in the direction perpendicular to the column direction to be enhanced. That is, the directivity of the antennas can be adjusted by adjusting the number of arrangement of the patch antennas.

[1.3 Structure of Antenna Module According to Second Modification]

Figure 5B:
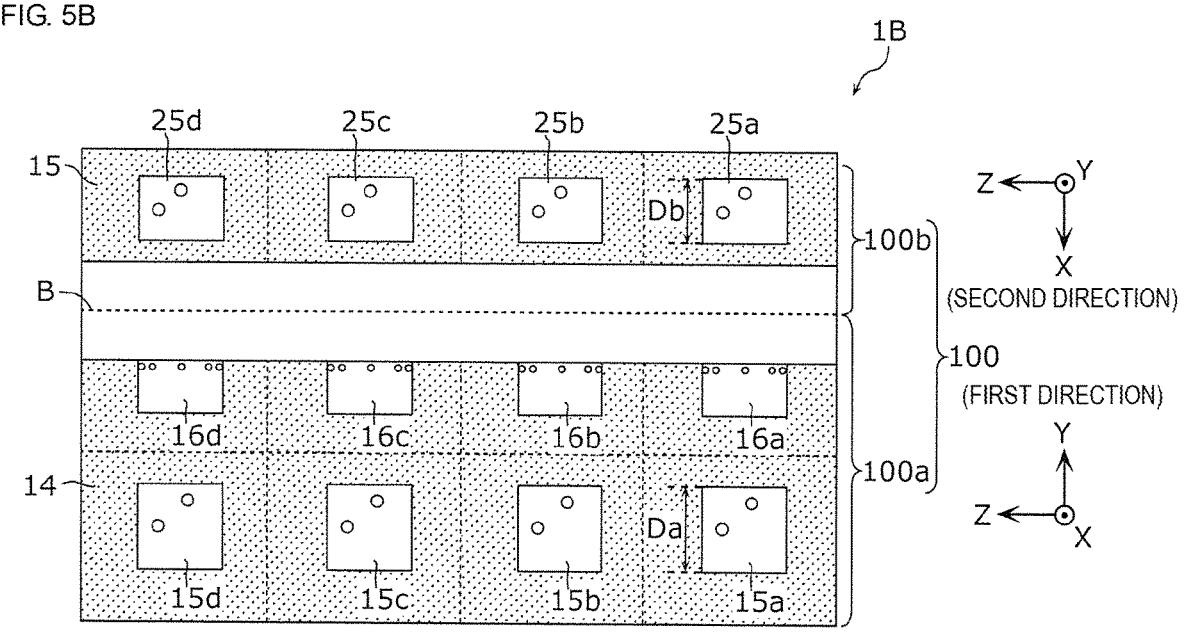
FIG. 5B illustrates an orthographic projection of an antenna module according to a second modification to the first embodiment.

FIG. 5B illustrates an orthographic projection of an antenna module 1B according to a second modification to the first embodiment. In the antenna module 1B according to the present modification, the first flat plate portion 100a and the second flat plate portion 100b are folded about 90 degrees along the boundary line B, and an L-shape is formed as in the antenna module 1. For conciseness of the structure, however, FIG. 5B illustrates the substrate 100 unfolded on a plane.

The antenna module 1B according to the present modification differs from the antenna module 1 according to the first embodiment in that the first patch antennas are arranged in two columns. Differences between the antenna module 1B according to the present modification and the antenna module 1 according to the first embodiment will be mainly described, and the same subject matters are omitted.

As illustrated in FIG. 5B, the antenna module 1B according to the present modification includes the substrate 100, the first patch antennas 15a, 15b, 15c, and 15d, first patch antennas 16a, 16b, 16c, and 16d, and the second patch antenna 25a, 25b, 25c, and 25d.

The substrate 100 includes the first flat plate portion 100a and the second flat plate portion 100b that have respective normals intersecting with each other and that are continuous. According to the present modification, the substrate 100 has an L-shape in which the first flat plate portion 100a and the second flat plate portion 100b are folded about 90 degrees along the boundary line B.

The first patch antennas 15a to 15d and 16a to 16d are formed on the first flat plate portion 100a and arranged in two columns in the column direction (Z-axis direction in FIG. 1) parallel to the boundary line B.

The second patch antennas 25a to 25d are formed on the second flat plate portion 100b and arranged in a column in the column direction (Z-axis direction in FIG. 1) parallel to the boundary line B.

Each of the first patch antennas 15a to 15d includes the normal (full) patch antenna illustrated in FIG. 3A.

Each of the second patch antennas 25a to 25d includes the normal (full) patch antenna illustrated in FIG. 3A. The size Db of the second patch antennas 25a to 25d in a second direction perpendicular to the column direction and parallel to a main surface of the second flat plate portion 100b is smaller than the size Da of the first patch antennas 15a to 15d in a first direction perpendicular to the column direction and parallel to a main surface of the first flat plate portion 100a.

Among the first patch antennas 15a to 15d and 16a to 16d, each of the first patch antennas 16a to 16d that are arranged in the column located nearest to the boundary line B includes the one-side-short-circuit microstrip (half patch) antenna illustrated in FIG. 3B.

In the antenna module 1B according to the present modification, each of the first patch antennas 16a to 16d that are arranged in the column located nearest to the boundary line B on the first flat plate portion 100a is formed such that the boundary line B, and the ground via conductor 23a (short circuit point) and the feed via conductor 22a (feed point) of the one-side-short-circuit microstrip antenna are arranged in this order.

With the above structure, the width of the second flat plate portion 100b (in the second direction) can be decreased because the size Db of the second patch antennas 25a to 25d in the second direction is smaller than the size Da of the first patch antennas 15a to 15d in the first direction. The one-side-short-circuit microstrip antennas (first patch antennas 16a to 16d) that are arranged in the column near the boundary line B on the first flat plate portion 100a can complement antenna performances that are degraded as a result that the size of the patch antennas on the second flat plate portion 100b is decreased. Consequently, the first flat plate portion 100a can be disposed parallel to a main surface of a housing of, for example, a cellular phone (communication device) that requires the reduced thickness, and the second flat plate portion 100b can be disposed parallel to a side surface of the housing. Since the first flat plate portion 100a and the second flat plate portion 100b are not disposed on the same flat surface, the antenna characteristics having plural values of directivity can be achieved. Accordingly, the antenna characteristics such as the coverage of antenna radiation and reception can be improved, and the thickness of the communication device on which the antenna module is disposed can be decreased.

In addition, the patch antennas that are arranged in columns on the first flat plate portion 100a enable the directivity in the direction perpendicular to the column direction to be enhanced. That is, the directivity of the antennas can be adjusted by adjusting the number of arrangement of the patch antennas.

The normal patch antennas on the first flat plate portion 100a and the normal patch antennas on the second flat plate portion 100b may be arranged in two or more columns. In the case where the normal patch antennas on the second flat plate portion 100b are arranged in two or more columns, the size, in the second direction, of the normal patch antenna that is arranged in the column located farthest from the boundary line B among the normal patch antennas on the second flat plate portion 100b in the two or more columns may be smaller than the size, in the first direction, of the normal patch antennas on the first flat plate portion 100a. This enables the width of the second flat plate portion 100b (in the second direction) to be decreased. The one-side-short-circuit microstrip antennas (first patch antennas 16a to 16d) that are arranged in the column near the boundary line B on the first flat plate portion 100a can complement antenna performances that are degraded as a result that the size of the patch antennas on the second flat plate portion 100b is decreased. Consequently, the first flat plate portion 100a can be disposed parallel to a main surface of a housing of, for example, a cellular phone (communication device) that requires the reduced thickness, and the second flat plate portion 100b can be disposed parallel to a side surface of the housing. Since the first flat plate portion 100a and the second flat plate portion 100b are not disposed on the same flat surface, the antenna characteristics having plural values of directivity can be achieved. Accordingly, the antenna characteristics such as the coverage of antenna radiation and reception can be improved, and the thickness of the communication device on which the antenna module is disposed can be decreased.

Also, with the above structure, the first patch antennas 15a to 15d form a first polarized wave that has directivity in the direction perpendicular to the first flat plate portion 100a and a second polarized wave that differs from the first polarized wave, and the second patch antennas 25a to 25d form a third polarized wave that has directivity in the direction perpendicular to the second flat plate portion 100b and a fourth polarized wave that differs from the third polarized wave. This enables the antenna module 1B to be a so-called dual-polarized-wave antenna module with respect to both of the radiation direction of the first patch antennas 15a to 15d and the radiation direction of the second patch antennas 25a to 25d.

The antenna module 1B according to the second modification may not include the first patch antennas 16a to 16d. Also, with this structure, the size Db, in the second direction, of the second patch antennas 25a to 25d that are disposed on the second flat plate portion 100b is smaller than the size Da, in the first direction, of the first patch antennas 15a to 15d that are disposed on the first flat plate portion 100a, and the width of the second flat plate portion 100b (in the direction perpendicular to the boundary line) can be less than that in an antenna module in which patch antennas include the first patch antennas 15a to 15d. Consequently, the first flat plate portion 100a can be disposed parallel to a main surface of a housing of a communication device that requires the reduced thickness, and the second flat plate portion 100b can be disposed parallel to a side surface of the housing. Since the first flat plate portion 100a and the second flat plate portion 100b are not disposed on the same flat surface, the antenna characteristics having plural values of directivity can be achieved. Accordingly, the antenna characteristics can be improved, and the thickness of the communication device on which the antenna module is disposed can be decreased.

[1.4 Structure of Communication Device]

The structure of a communication device that includes the antenna module 1 or 1A according to the present embodiment will now be described.

Figure 6A:
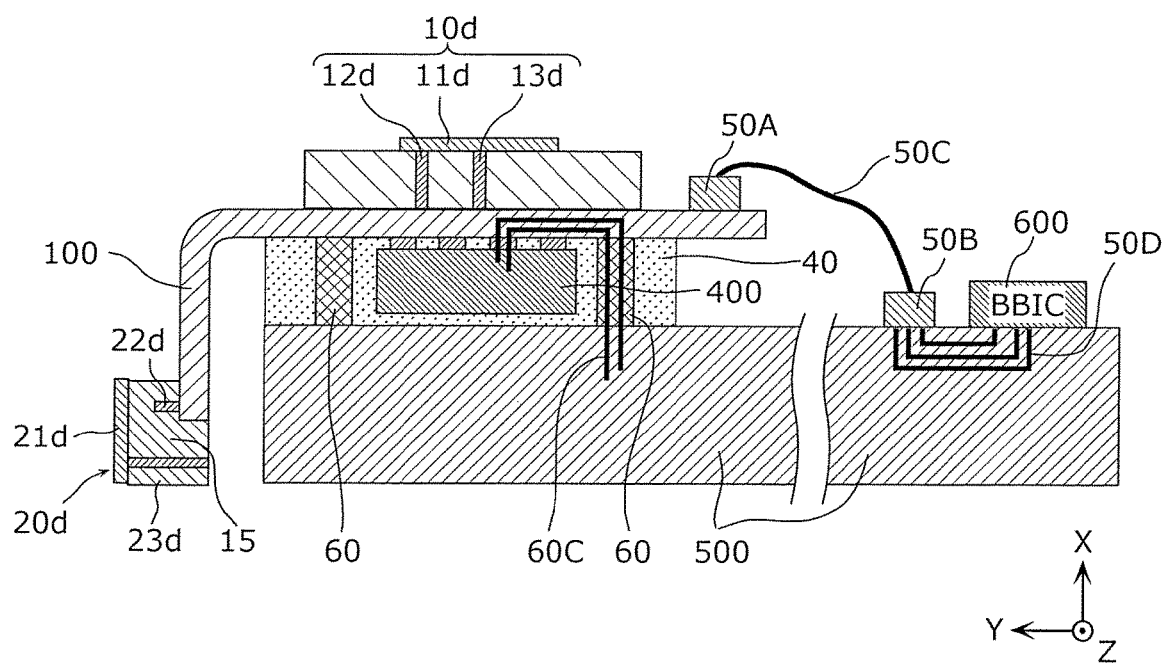
FIG. 6A is a sectional view of the antenna module according to the first embodiment that is mounted.
Figure 6B:
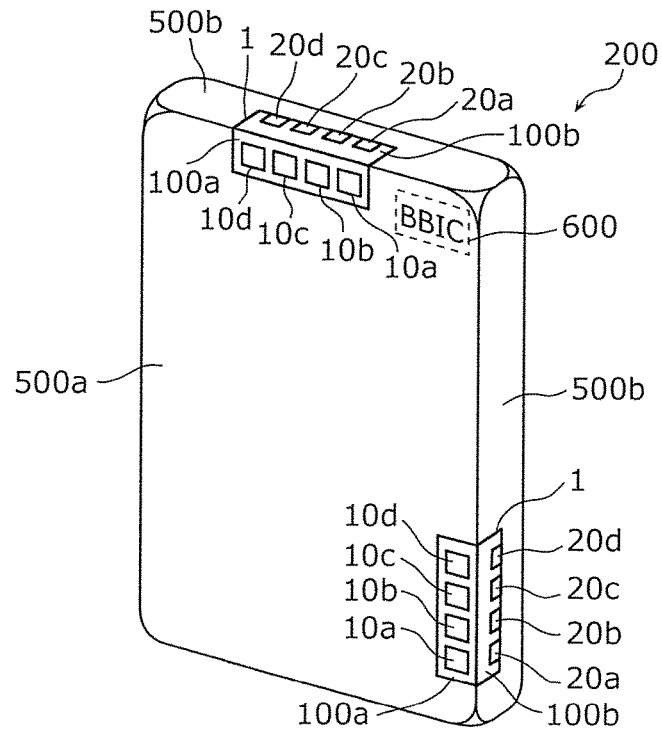
FIG. 6B is a perspective view of a communication device according to the first embodiment.

FIG. 6A is a sectional view of the antenna module 1 according to the first embodiment that is mounted on a mounting substrate 500. FIG. 6B is a perspective view of a communication device 200 according to the first embodiment. As illustrated in FIG. 6A, the antenna module 1 further includes a radio frequency circuit component 400 in addition to the antenna module 1 illustrated in FIG. 1. The radio frequency circuit component 400 includes a radio frequency integrated circuit (RFIC). The radio frequency circuit component 400 may include a radio frequency circuit element such as a radio frequency filter, an inductor, or a capacitor in addition to the radio frequency integrated circuit (RFIC). The radio frequency circuit component 400 may be a component in which the radio frequency integrated circuit (RFIC) and the radio frequency circuit element are disposed in a single package or may be a single chip component (IC component).

The radio frequency circuit component 400 is disposed on a surface of the first flat plate portion 100a opposite to the surface on which the first patch antenna 10d is formed. The radio frequency circuit component 400 is covered by a resin member 40 filled between the substrate 100 and the mounting substrate 500. This ensures mounting strength between the antenna module 1 and the mounting substrate 500. The radio frequency circuit component 400 is electrically connected to the substrate 100 that also serves as the transmission line layer of the antenna module 1 with an external mounting electrode, for example, interposed therebetween. A solder bump may be used as the external mounting electrode.

The radio frequency circuit component 400 is connected to a wiring line 60C that is formed in the substrate 100 and a columnar electrode 60 and inputs and outputs, for example, a power supply voltage and a control signal. The columnar electrode 60 is composed of, for example, Cu. The columnar electrode 60 may not be disposed around the radio frequency circuit component 400. However, in the case where the columnar electrode 60 is disposed, the columnar electrode 60 serves as a heat dissipation path and can improve the heat dissipation.

The RFIC of the radio frequency circuit component 400 performs a signal processing of a transmission system for outputting, to the first patch antennas 10a to 10d and the second patch antennas 20a to 20d, a signal that is received from a BBIC 600 via connectors 50A and 50B and wiring lines 50C and 50D and that is up-converted, or a signal processing of a reception system for outputting, to the BBIC 600, a radio frequency signal that is received from the first patch antennas 10a to 10d and the second patch antennas 20a to 20d and that is down-converted, or both. The wiring line 50C is preferably a coaxial line for transmitting a LO signal and an IF signal.

Regarding the form of a joint between the radio frequency circuit component 400 and the mounting substrate 500, a Cu surface that is formed on the back surface of the radio frequency circuit component 400 may be joined to the mounting substrate 500. In this case, a method of forming the Cu surface on the back surface of the radio frequency circuit component 400 is that a Cu plate is secured to the back surface of the radio frequency circuit component 400 with, for example, a highly conductive adhesive and is covered by resin, which is subsequently cut until the Cu plate is exposed. Finally, the exposed Cu surface is soldered to the mounting substrate. In this way, the heat generated by the radio frequency circuit component 400, particularly, the RFIC can be dissipated via the mounting substrate 500.

With the above structure, the first patch antennas 10a to 10d and the RFIC can be disposed with the first flat plate portion 100a interposed therebetween. Accordingly, the length of the transmission line 95 that connects the RFIC and the first patch antennas 10a to 10d to each other can be decreased. In this case, the second patch antennas 20a to 20d and the RFIC can be disposed with the second flat plate portion 100b interposed therebetween. Accordingly, the length of the transmission line 95 that connects the RFIC and the second patch antennas 20a to 20d to each other can be decreased. Consequently, the loss of transmission of the radio frequency signal can be reduced.

As illustrated in FIG. 6B, the communication device 200 includes the antenna module 1 illustrated in FIG. 6A, the BBIC 600, the radio frequency circuit component 400, and the mounting substrate 500. The communication device 200 is used for, for example, a cellular phone.

The mounting substrate 500 is a substrate on which the BBIC 600 and the radio frequency circuit component 400 are mounted, and an example thereof is a printed circuit board. The mounting substrate 500 may be a housing of the communication device 200.

As illustrated in FIG. 6B, in the communication device 200 according to the present embodiment, a main surface of the first flat plate portion 100a faces a main surface 500a of the mounting substrate 500, and a main surface of the second flat plate portion 100b faces a side surface 500b of an end portion of the mounting substrate 500.

With the above structure, the width of the second flat plate portion 100b of the antenna module 1 is decreased, and the second flat plate portion 100b is disposed parallel to the side surface 500b of the end portion of the mounting substrate 500 (or the housing) of the communication device 200. Accordingly, the antenna characteristics such as the coverage of antenna radiation and reception can be improved, and the thickness of the communication device 200 can be decreased.

Second Embodiment

[2.1 Structure of Antenna Module]

According to the present embodiment, a structure for compensating the polarization direction of the second patch antennas of the antenna module 1 according to the first embodiment will be described.

FIG. 7 illustrates three views (a front view, a plan view, and a side view) of the shape of an antenna module 2 according to a second embodiment.

As illustrated in FIG. 7, the antenna module 2 according to the present embodiment includes the substrate 100, the first patch antennas 10a, 10b, 10c, and 10d, the second patch antennas 20a, 20b, 20c, and 20d, and notch antennas 30a, 30b, 30c, and 30d. The antenna module 2 according to the present embodiment differs from the antenna module 1 according to the first embodiment in including the notch antennas 30a to 30d. Differences between the antenna module 2 according to the present embodiment and the antenna module 1 according to the first embodiment will be mainly described, and the same subject matters are omitted.

The first flat plate portion 100a has a first main surface 101 and a second main surface 102 that face away from each other. The second flat plate portion 100b has a third main surface 103 and a fourth main surface 104 that face away from each other. The first main surface 101 and the third main surface 103 are continuous. The second main surface 102 and the fourth main surface 104 are continuous.

The first patch antennas 10a to 10d are disposed near the first main surface 101 among the first main surface 101 and the second main surface 102. The second patch antennas 20a to 20d are disposed near the third main surface 103 among the third main surface 103 and the fourth main surface 104.

The notch antennas 30a to 30d are arranged in a column in the column direction (Z-axis direction in FIG. 7) parallel to the boundary line B between the first patch antennas 10a to 10d and the second patch antennas 20a to 20d.

Each of the notch antennas 30a to 30d includes planar ground conductor patterns that are formed on a surface of the dielectric layer 14, a non-ground-forming region that is interposed between the ground conductor patterns, a radiation electrode that is disposed on the surface within the non-ground-forming region, and a feed line. A radio frequency signal that is fed to the feed line is radiated from the radiation electrode.

The first patch antennas 10a to 10d have directivity in the upward direction (positive X-axis direction in FIG. 7) perpendicular to the first flat plate portion 100a. The notch antennas 30a to 30d, however, have directivity mainly in the upward direction (positive Y-axis direction in FIG. 7) of the second flat plate portion 100b.

Figure 9:
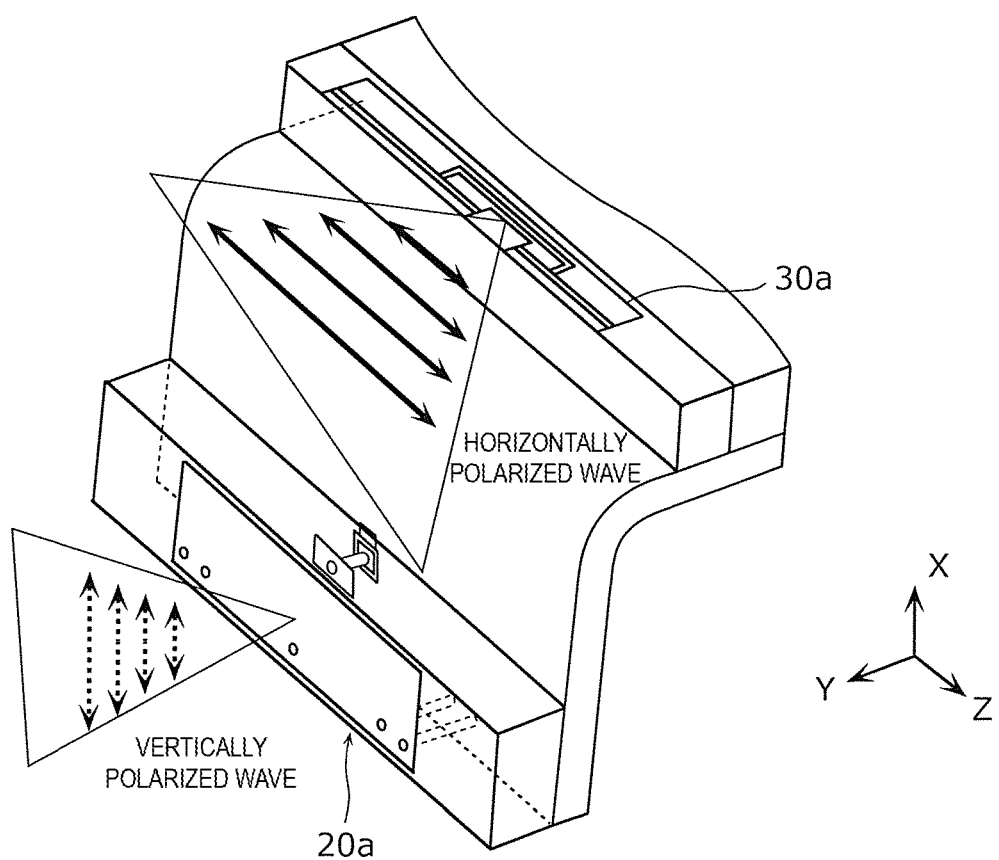
FIG. 9 illustrates the polarization direction of one of second patch antennas and one of notch antennas.

FIG. 8 illustrates the polarization direction of the first patch antenna 10a. FIG. 9 illustrates the polarization direction of the second patch antenna 20a and the notch antenna 30a.

As illustrated in FIG. 8, in the first patch antenna 10a, a radio frequency signal that is radiated from the feed via conductor 12a (first feed point) forms a vertically polarized wave (first polarized wave) with the Y-axis direction being the main direction of the polarization direction. A radio frequency signal that is radiated from the feed via conductor 13a (second feed point) forms a horizontally polarized wave (second polarized wave) with the Z-axis direction being the main direction of the polarization direction.

As illustrated in FIG. 9, a radio frequency signal that is radiated from the second patch antenna 20a forms a vertically polarized wave (third polarized wave) with the X-axis direction being the main direction of the polarization direction. A radio frequency signal that is radiated from the notch antenna 30a forms a horizontally polarized wave (fourth polarized wave) with the Z-axis direction being the main direction of the polarization direction.

FIG. 10 illustrates graphs of antenna radiation patterns of the second patch antennas 20a to 20d and the notch antennas 30a to 30d. The antenna radiation patterns when only the second patch antennas 20a to 20d are operated are illustrated at the left half in the figure. The antenna radiation patterns when only the notch antennas 30a to 30d are operated are illustrated at the right half in the figure.

As illustrated in FIG. 10, when only the second patch antennas 20a to 20d are operated, the peak gain in the vertical direction is 7.72 dB, and the peak gain in the horizontal direction is −6.77 dB. It can be said that the second patch antennas 20a to 20d have a performance only on the vertically polarized wave.

When only the notch antennas 30a to 30d are operated, the peak gain in the vertical direction is −7.68 dB, and the peak gain in the horizontal direction is 6.78 dB.

Consequently, regarding the second patch antennas 20a to 20d and the notch antennas 30a to 30d, the gain of a main polarized wave of a partner antenna is sufficiently small, there is no interference therebetween, and the two kinds of the antennas can provide two polarized waves of the vertically polarized wave (third polarized wave) and the horizontally polarized wave (fourth polarized wave).

The second patch antennas 20a to 20d that include the one-side-short-circuit microstrip antennas are limited by the formation of the polarized wave in one direction. The first patch antennas 10a to 10d that include the normal (full) patch antennas can form the polarized waves in two directions by providing the single radiation electrode with plural feed points.

With the above structure, the notch antennas 30a to 30d are disposed near the second patch antennas 20a to 20d. Accordingly, not only the vertically polarized wave (third polarized wave) can be formed by the second patch antennas 20a to 20d in the radiation direction of the second patch antennas 20a to 20d, but also the horizontally polarized wave (fourth polarized wave) can be formed by the notch antennas 30a to 30d. This enables the antenna module 2 to be a so-called dual-polarized-wave antenna module with respect to both of the radiation direction of the first patch antennas 10a to 10d and the radiation direction of the second patch antennas 20a to 20d.

According to the present embodiment, the notch antennas 30a to 30d are disposed on the first main surface 101 of the first flat plate portion 100a.

In this case, since the notch antennas 30a to 30d, which are disposed near the second patch antennas 20a to 20d, are not disposed on the second flat plate portion 100b but on the first flat plate portion 100a, the width of the second flat plate portion 100b is prevented from increasing due to the arrangement of the notch antennas 30a to 30d. Accordingly, the antenna module 2 can be the dual-polarized-wave antenna module, and the thickness of a communication device on which the antenna module 2 is disposed can be decreased.

An angle that is formed between the polarization direction of the vertically polarized wave (third polarized wave) and the polarization direction of the horizontally polarized wave (fourth polarized wave) of the second patch antennas 20a to 20d is preferably about 90 degrees.

In this case, the isolation between the second patch antennas 20a to 20d and the notch antennas 30a to 30d can be optimized.

An angle that is formed between the polarization direction of the vertically polarized wave (first polarized wave) and the polarization direction of the horizontally polarized wave (second polarized wave) of the first patch antennas 10a to 10d is preferably about 90 degrees.

In this case, the isolation between the vertically polarized wave (first polarized wave) and the horizontally polarized wave (second polarized wave) from the first patch antennas 10a to 10d can be optimized.

[2.2 Structure of Antenna Module According to Modification]

FIG. 11 illustrates three views of the shape of an antenna module 2A according to a modification to the second embodiment. As illustrated in the figure, the antenna module 2A according to the present modification includes the substrate 100, the first patch antennas 10a, 10b, 10c, and 10d, the second patch antennas 20a, 20b, 20c, and 20d, and dipole antennas 35a, 35b, 35c, and 35d. The antenna module 2A according to the present modification differs from the antenna module 2 according to the second embodiment in including the dipole antennas 35a to 35d instead of the notch antennas 30a to 30d. Differences between the antenna module 2A according to the present modification and the antenna module 2 according to the second embodiment will be mainly described, and the same subject matters are omitted.

The dipole antennas 35a to 35d are arranged in a column in the column direction (Z-axis direction in FIG. 11) parallel to the boundary line B between the first patch antennas 10a to 10d and the second patch antennas 20a to 20d.

The first patch antennas 10a to 10d have directivity in the upward direction (positive X-axis direction in FIG. 7) of the first flat plate portion 100a. The dipole antennas 35a to 35d, however, have directivity mainly in the upward direction (positive Y-axis direction in FIG. 7) of the second flat plate portion 100b.

The second patch antennas 20a to 20d that include the one-side-short-circuit microstrip antennas are limited by the formation of the polarized wave in one direction. The first patch antennas 10a to 10d that include the normal (full) patch antennas can form the polarized waves in two directions by providing the single radiation electrode with plural feed points.

With the above structure, the dipole antennas 35a to 35d are disposed near the second patch antennas 20a to 20d. Accordingly, not only the vertically polarized wave (first polarized wave) is formed by the second patch antennas 20a to 20d in the radiation direction of the second patch antennas 20a to 20d, but also the horizontally polarized wave (second polarized wave) can be formed by the dipole antennas 35a to 35d. This enables the antenna module 2A to be a so-called dual-polarized-wave antenna module with respect to both of the radiation direction of the first patch antennas 10a to 10d and the radiation direction of the second patch antennas 20a to 20d.

According to the present embodiment, the dipole antennas 35a to 35d are disposed on the first main surface 101 of the first flat plate portion 100a.

In this case, since the dipole antennas 35a to 35d, which are disposed near the second patch antennas 20a to 20d, are not disposed on the second flat plate portion 100b but on the first flat plate portion 100a, the width of the second flat plate portion 100b is prevented from increasing due to the arrangement of the dipole antennas 35a to 35d. Accordingly, the antenna module 2A can be the dual-polarized-wave antenna module, and the thickness of a communication device on which the antenna module 2A is disposed can be decreased.

[2.3 Sectional Structure of Second Patch Antenna]

Figure 12A:
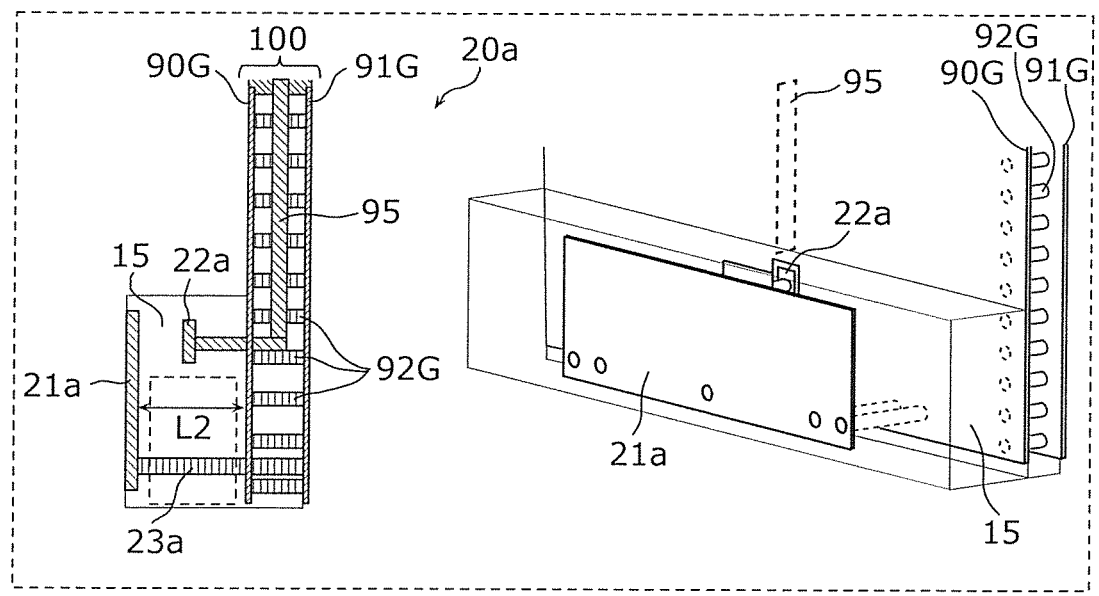
FIG. 12A illustrates a sectional view and a perspective view of one of the second patch antennas.

FIG. 12A illustrates a sectional view and a perspective view of the second patch antenna 20a. As illustrated in the figure, the second patch antenna 20a that has a one-side-short-circuit microstrip structure includes the ground electrode layers 90G and 91G, the dielectric layer 15 that is formed on the ground electrode layers 90G and 91G, the radiation electrode 21a that is formed on the dielectric layer 15, the feed via conductor 22a that connects the feed point and the transmission line 95 to each other, and the ground via conductor 23a that connects the short circuit point of the radiation electrode 21a and the ground electrode layers 90G and 91G to each other. The ground electrode layers 90G and 91G and the ground via conductor 92G are included in the ground electrode.

With the above structure, the ground via conductor 23a is connected to an end of the radiation electrode 21a, and capacitance coupling occurs between the feed via conductor 22a (feed point) and the other end of the radiation electrode 21a opposite the end. It is not necessary for the transmission line 95 to be disposed near the ground via conductor 23a, and it is not necessary for the ground electrode for surrounding the transmission line 95 to be disposed near the ground via conductor 23a.

Figure 12B:
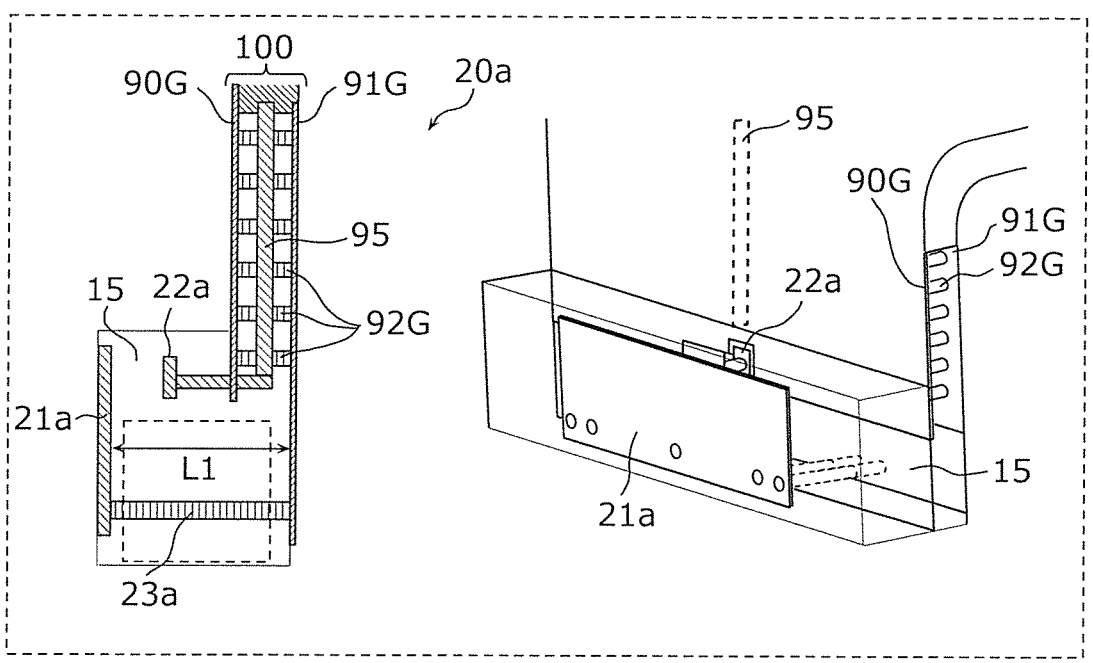
FIG. 12B illustrates a sectional view and a perspective view of the second patch antenna in which the position of a ground electrode is changed.

FIG. 12B illustrates a sectional view and a perspective view of the second patch antenna 20a in which the position of the ground electrode is changed. As illustrated in the figure, it is not necessary for the transmission line 95 to be disposed near the ground via conductor 23a, and the ground electrode layer 90G and the ground via conductor 92G near the ground via conductor 23a can be decreased. Consequently, the distance L1 between the radiation electrode 21a and the ground electrode (ground electrode layer 91G) in a region near the ground via conductor 23a can be longer than the distance L2 between the radiation electrode 21a and the ground electrode (ground electrode layer 90G) in a region near the feed via conductor 22a. In other words, the thickness of the dielectric layer 15 in the region near the ground via conductor 23a can be more than the thickness of the dielectric layer 15 in the region near the feed via conductor 22a. Accordingly, the band width of the second patch antenna 20a, which is the one-side-short-circuit microstrip antenna, can be increased.

[2.4 Effect of Ground Electrode Layers on Notch Antennas]

FIGS. 13A, 13B and 13C illustrate the antenna radiation patterns of the notch antennas 30a to 30d with different structures of the ground electrode.

As illustrated in FIG. 13A, in the case where there is no ground electrode (substrate 100) in front of the notch antennas 30a to 30d in the positive Y-axis direction, the directivity of the notch antennas 30a to 30d roughly coincides with the Y-axis direction, and the peak gain is 7.31 dB.

As illustrated in FIG. 13B, in the case where the ground electrode (substrate 100) is located in front of the notch antennas 30a to 30d in the positive Y-axis direction as in the antenna modules 2 and 2A according to the present embodiment, the directivity of the notch antennas 30a to 30d disperses due to the effect of the ground electrode, and the direction of a radiation peak changes from the positive Y-axis direction to the positive X-axis direction, and the peak gain is 2.17 dB.

As illustrated in FIG. 13C, however, in the case where a part of the ground electrode that is located in front of the notch antennas 30a to 30d in the positive Y-axis direction is decreased, the direction of the radiation peak is affected by the ground electrode, but the directivity of the notch antennas 30a to 30d is inhibited from dispersing, and the peak gain is 6.78 dB.

That is, the directivity of the notch antennas 30a to 30d can be improved in a manner in which the area of the ground electrode that is disposed between the notch antennas 30a to 30d and the second patch antennas 20a to 20d is decreased.

[2.5 Effect of Parasitic Radiation Electrodes on Notch Antennas]

Figure 14A:
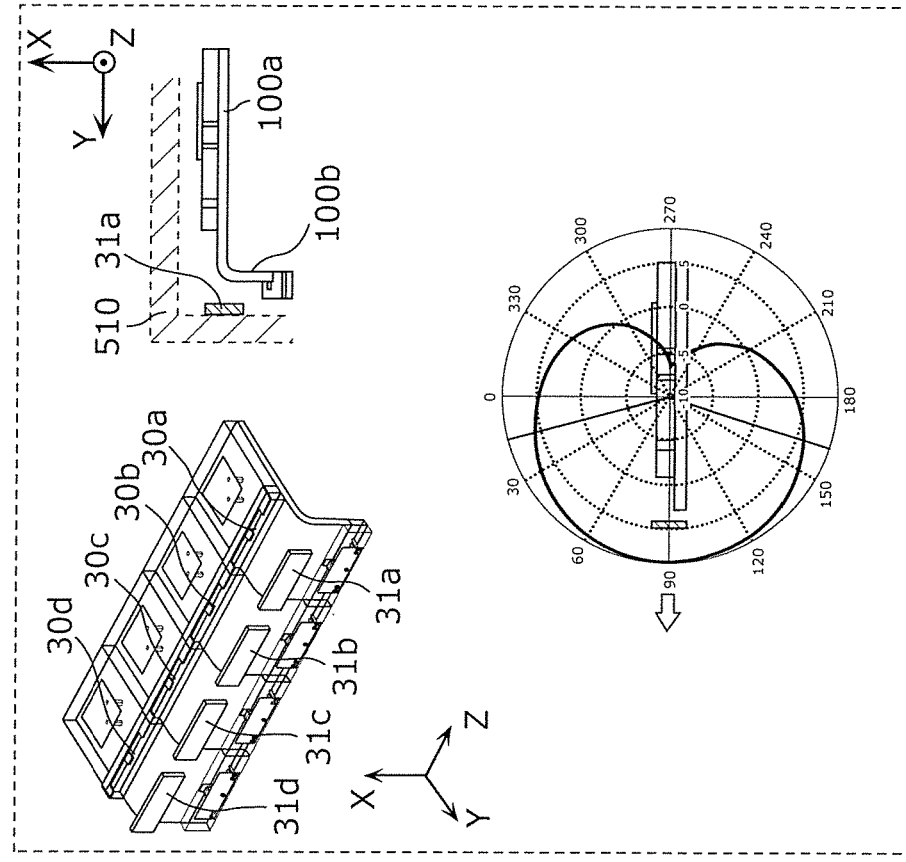
FIGS. 14A and 14B illustrate the comparison between the antenna radiation patterns of notch antennas that include parasitic radiation electrodes.
Figure 14B:
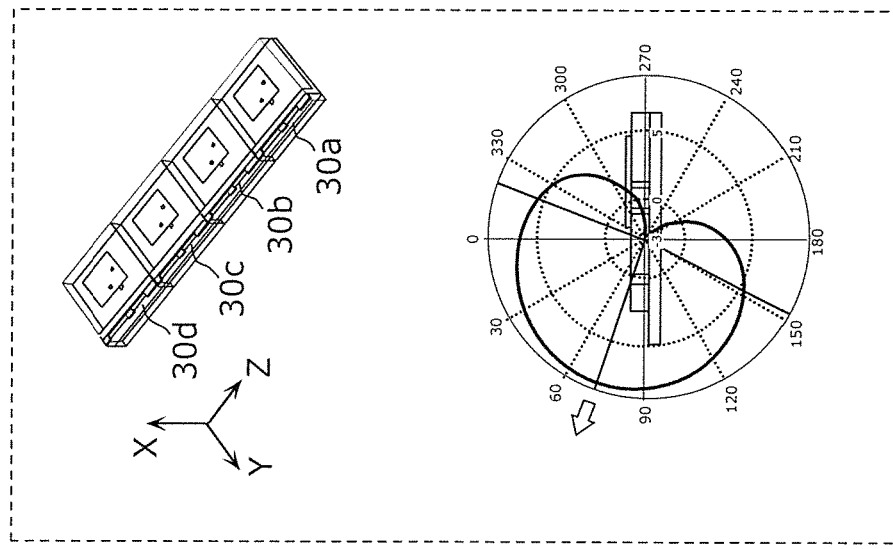

FIGS. 14A and 14B illustrate comparison of the antenna radiation patterns of notch antennas that include parasitic radiation electrodes 31a to 31d.

As illustrated in FIG. 14A, the directivity of the notch antennas 30a to 30d according to the present embodiment roughly coincides with the positive Y-axis direction but slightly inclines in the X-direction in some cases. However, the notch antennas 30a to 30d according to the present modification include the parasitic radiation electrodes 31a to 31d. As illustrated in a sectional view in FIG. 14B, the radiation electrodes 31a to 31d are separated from the substrate 100 and located at a position away from the notch antennas 30a to 30d in the upward direction (positive Y-axis direction) perpendicular to the second flat plate portion 100b. The radiation electrodes 31a to 31d are disposed, for example, on an inner side surface of a housing 510 of a communication device. As illustrated in the radiation pattern in FIG. 14B, the directivity of the notch antennas 30a to 30d is improved due to the arrangement of the radiation electrodes 31a to 31d and coincides with the positive Y-axis direction as a result of the component of inclination in the X-axis direction being decreased. It can be said that the radiation electrodes 31a to 31d serve as wave directors of the notch antennas 30a to 30d.

Not only the parasitic radiation electrodes of the notch antennas 30a to 30d but also parasitic radiation electrodes for improving the directivity of the second patch antennas 20a to 20d may be provided. For example, the parasitic radiation electrodes of the second patch antennas 20a to 20d are preferably separated from the substrate 100 and preferably located at a position away from the notch antennas 30a to 30d in the upper direction (positive Y-axis direction) perpendicular to the second flat plate portion 100b and below the radiation electrodes 31a to 31d (in the negative X-axis direction). This improves the directivity of the second patch antennas 20a to 20d in the Y-axis direction.

(Other Modifications)

The antenna modules and the communication devices according to the embodiments of the present disclosure and an example thereof are described above. The present disclosure, however, is not limited to the above embodiments and the example. The present disclosure includes other embodiments obtained by combining freely selected features according to the above embodiments, modifications obtained by modifying the above embodiments by a person skilled in the art without departing from the spirit of the present disclosure, and various devices that include the antenna modules and the communication devices according to the present disclosure.

For example, in addition to the L-shape in which the first flat plate portion 100a and the second flat plate portion 100b are folded along the boundary line B, an antenna module according to the present disclosure may include a third flat plate portion that is continuous to the second flat plate portion 100b, and the direction of the normal thereof may intersect the second flat plate portion 100b. In this case, the first flat plate portion 100a and the third flat plate portion typically face each other and are substantially parallel to each other. The third flat plate portion may include the normal (full) patch antenna. In this case, for example, the thickness of a cellular phone can be decreased in a manner in which the first flat plate portion 100a is disposed on a first main surface (front surface) of the cellular phone, the third flat plate portion is disposed on a second main surface (back surface) that faces away from the first main surface, and the second flat plate portion is disposed on a side surface of an end portion that connects the first main surface and the second main surface to each other.

The radio frequency integrated circuit (RFIC) of the communication device 200 may include a power amplifier that amplifies a radio frequency signal and a low-noise amplifier.

Regarding the first patch antennas and the second patch antennas in examples described according to the above first and second embodiments, four patch antennas are arranged in the column direction parallel to the boundary line B. However, the number of the first patch antennas and the second patch antennas that are arranged in each column may be one or more. Even in the case where the single first patch antenna is arranged per column and the case where the single second patch antenna is arranged per column, the cases are expressed such that the single first patch antenna is arranged in the column and the single second patch antenna is arranged in the column.

The present disclosure can be used as antenna modules having good antenna characteristics such as the coverage of antenna radiation and reception for millimeter band mobile communication systems and communication devices that need to decrease the thickness.

1, 1A, 1B, 2, 2A antenna module
10a, 10b, 10c, 10d, 15a, 15b, 15c, 15d, 16a, 16b, 16c, 16d first patch antenna
11a, 11b, 11c, 11d, 21a, 21b, 21c, 21d, 31a, 31b, 31c, 31d radiation electrode
12a, 12b, 12c, 12d, 13a, 13b, 13c, 13d, 22a, 22b, 22c, 22d feed via conductor
14, 15, 16 dielectric layer
20a, 20b, 20c, 20d, 25a, 25b, 25c, 25d second patch antenna
23a, 23b, 23c, 23d, 92G ground via conductor
30a, 30b, 30c, 30d notch antenna
35a, 35b, 35c, 35d dipole antenna
40 resin
50A, 50B connector
50C, 50D, 60C wiring line
60 columnar electrode
90G, 91G ground electrode layer
95 transmission line
100 substrate
100a first flat plate portion
100b second flat plate portion
101 first main surface
102 second main surface
103 third main surface
104 fourth main surface
200 communication device
400 radio frequency circuit component
500 mounting substrate
500a main surface
500b side surface of an end portion
600 base band integrated circuit (BBIC)

The invention claimed is:

1. An antenna module comprising:
a substrate including a first flat plate portion and a second flat plate portion, wherein the first flat plate portion and the second flat plate portion are continuous, and normal directions of the first flat plate portion and the second flat plate portion are intersected with each other;
one or more first patch antennas provided on the first flat plate portion; and
one or more second patch antennas provided on the second flat plate portion,
wherein the one or more first patch antennas are arranged in at least a column in a column direction parallel to a boundary line between the first flat plate portion and the second flat plate portion,
wherein the one or more second patch antennas are arranged in at least a column in the column direction, and
wherein a size, in a second direction, of each one or more of the one or more second patch antennas arranged in a column located farthest from the boundary line is smaller than a size, in a first direction, of the one or more first patch antennas, and a width of the second flat plate portion is narrower than a width of the first flat portion, each of the one or more second patch antennas being a one-side-short-circuit microstrip antenna in which a ground via conductor connects one end of a radiation electrode to a ground electrode, wherein the second direction is perpendicular to the column direction and parallel to a main surface of the second flat plate portion, and the first direction is perpendicular to the column direction and parallel to a main surface of the first flat plate portion.

2. The antenna module according to claim 1, wherein the second patch antennas arranged in the column located farthest from the boundary line are one-side-short-circuit microstrip antennas.

3. The antenna module according to claim 1, wherein each one or more of the second patch antennas arranged in the column located farthest from the boundary line includes the radiation electrode configured to radiate or receive a radio frequency signal, the ground electrode provided in the second flat plate portion or on the second flat plate portion, and the ground via conductor connecting a short circuit point located at an end of the radiation electrode to the ground electrode, and a feed via conductor connecting a feed point to a transmission line provided in the second flat plate portion or on the second flat plate portion, the radio frequency signal being fed to the radiation electrode through the transmission line.

4. The antenna module according to claim 3, wherein each one or more of the second patch antennas arranged in the column located farthest from the boundary line includes a dielectric layer provided between the radiation electrode and the ground electrode, and wherein a distance between the radiation electrode and the ground electrode in a region near the ground via conductor is longer than a distance between the radiation electrode and the ground electrode in a region near the feed via conductor.

5. The antenna module according to claim 2, wherein the first flat plate portion has a first main surface and a second main surface facing away from each other, wherein the second flat plate portion has a third main surface and a fourth main surface facing away from each other, wherein the first main surface and the third main surface are continuous, and the second main surface and the fourth main surface are continuous, wherein the one or more first patch antennas are disposed near the first main surface among the first main surface and the second main surface, wherein the one or more second patch antennas are disposed near the third main surface among the third main surface and the fourth main surface, wherein the antenna module further comprises one or more notch antennas or one or more dipole antennas, and the one or more notch antennas or the one or more dipole antennas are disposed between the one or more first patch antennas and the one or more second patch antennas, wherein the one or more first patch antennas form a first polarized wave and a second polarized wave different from the first polarized wave, wherein the one or more second patch antennas form a third polarized wave, wherein the one or more notch antennas or the one or more dipole antennas form a fourth polarized wave different from the third polarized wave, wherein the first polarized wave and the second polarized wave have directivity in a direction perpendicular to the first flat plate portion, and wherein the third polarized wave and the fourth polarized wave have directivity in a direction perpendicular to the second flat plate portion.

6. The antenna module according to claim 5, wherein the one or more notch antennas or the one or more dipole antennas are disposed on the first main surface.

7. The antenna module according to claim 1, wherein the first flat plate portion has a first main surface and a second main surface facing away from each other, wherein the second flat plate portion has a third main surface and a fourth main surface facing away from each other, wherein the first main surface and the third main surface are continuous, and the second main surface and the fourth main surface are continuous, wherein the one or more first patch antennas are disposed near the first main surface among the first main surface and the second main surface, wherein the one or more second patch antennas are disposed near the third main surface among the third main surface and the fourth main surface, wherein the antenna module further comprises one or more one-side-short-circuit microstrip antennas provided on the first flat plate portion between the one or more first patch antennas and the one or more second patch antennas, wherein the one or more first patch antennas form a first polarized wave and a second polarized wave different from the first polarized wave, wherein the one or more second patch antennas form a third polarized wave and a fourth polarized wave different from the third polarized wave, wherein the first polarized wave and the second polarized wave have directivity in a direction perpendicular to the first flat plate portion, and wherein the third polarized wave and the fourth polarized wave have directivity in a direction perpendicular to the second flat plate portion.

8. The antenna module according to claim 5, wherein an angle that is formed between a polarization direction of the first polarized wave and a polarization direction of the second polarized wave is about 90 degrees.

9. The antenna module according to claim 5, wherein an angle between a polarization direction of the third polarized wave and a polarization direction of the fourth polarized wave is about 90 degrees.

10. The antenna module according to claim 1, further comprising:

a radio frequency integrated circuit disposed on a surface of the first flat plate portion opposite to a surface on which the one or more first patch antennas are provided, wherein the radio frequency integrated circuit performs a transmission-type signal processing of up-converting a signal received from a base band integrated circuit to output to the one or more first patch antennas and the one or more second patch antennas, or a reception-type signal processing of down-converting a radio frequency signal received from the one or more first patch antennas and the one or more second patch antennas to output to the base band integrated circuit, or both of the transmission-type signal processing and the reception-type signal processing.

11. A communication device comprising:
the antenna module according to claim 10;
the base band integrated circuit; and
a mounting substrate on which the base band integrated circuit and the radio frequency integrated circuit are mounted,
wherein the main surface of the first flat plate portion faces a main surface of the mounting substrate, and
wherein the main surface of the second flat plate portion faces a side surface of an end portion of the mounting substrate.

12. The antenna module according to claim 3,
wherein the first flat plate portion has a first main surface and a second main surface facing away from each other,
wherein the second flat plate portion has a third main surface and a fourth main surface facing away from each other,
wherein the first main surface and the third main surface are continuous, and the second main surface and the fourth main surface are continuous,
wherein the one or more first patch antennas are disposed near the first main surface among the first main surface and the second main surface,
wherein the one or more second patch antennas are disposed near the third main surface among the third main surface and the fourth main surface,
wherein the antenna module further comprises one or more notch antennas or one or more dipole antennas, and the one or more notch antennas or the one or more dipole antennas are disposed between the one or more first patch antennas and the one or more second patch antennas,
wherein the one or more first patch antennas form a first polarized wave and a second polarized wave different from the first polarized wave,
wherein the one or more second patch antennas form a third polarized wave,
wherein the one or more notch antennas or the one or more dipole antennas form a fourth polarized wave different from the third polarized wave,
wherein the first polarized wave and the second polarized wave have directivity in a direction perpendicular to the first flat plate portion, and
wherein the third polarized wave and the fourth polarized wave have directivity in a direction perpendicular to the second flat plate portion.

13. The antenna module according to claim 4,
wherein the first flat plate portion has a first main surface and a second main surface facing away from each other,
wherein the second flat plate portion has a third main surface and a fourth main surface facing away from each other,
wherein the first main surface and the third main surface are continuous, and the second main surface and the fourth main surface are continuous,
wherein the one or more first patch antennas are disposed near the first main surface among the first main surface and the second main surface,
wherein the one or more second patch antennas are disposed near the third main surface among the third main surface and the fourth main surface,
wherein the antenna module further comprises one or more notch antennas or one or more dipole antennas, and the one or more notch antennas or the one or more dipole antennas are disposed between the one or more first patch antennas and the one or more second patch antennas,
wherein the one or more first patch antennas form a first polarized wave and a second polarized wave different from the first polarized wave,
wherein the one or more second patch antennas form a third polarized wave,
wherein the one or more notch antennas or the one or more dipole antennas form a fourth polarized wave different from the third polarized wave,
wherein the first polarized wave and the second polarized wave have directivity in a direction perpendicular to the first flat plate portion, and
wherein the third polarized wave and the fourth polarized wave have directivity in a direction perpendicular to the second flat plate portion.

14. The antenna module according to claim 6,
wherein an angle that is formed between a polarization direction of the first polarized wave and a polarization direction of the second polarized wave is about 90 degrees.

15. The antenna module according to claim 7,
wherein an angle that is formed between a polarization direction of the first polarized wave and a polarization direction of the second polarized wave is about 90 degrees.

16. The antenna module according to claim 6,
wherein an angle between a polarization direction of the third polarized wave and a polarization direction of the fourth polarized wave is about 90 degrees.

17. The antenna module according to claim 7,
wherein an angle between a polarization direction of the third polarized wave and a polarization direction of the fourth polarized wave is about 90 degrees.

18. The antenna module according to claim 8,
wherein an angle between a polarization direction of the third polarized wave and a polarization direction of the fourth polarized wave is about 90 degrees.

19. The antenna module according to claim 1, further comprising:
a radio frequency integrated circuit disposed on a surface of the first flat plate portion opposite to a surface on which the one or more first patch antennas are provided, wherein the radio frequency integrated circuit performs a transmission-type signal processing of up-converting a signal received from a base band integrated circuit to output to the one or more first patch antennas and the one or more second patch antennas, or a reception-type signal processing of down-converting a radio frequency signal received from the one or more first patch antennas and the one or more second patch antennas to output to the base band integrated circuit, or both of the transmission-type signal processing and the reception-type signal processing.

20. The antenna module according to claim 3, further comprising:
a radio frequency integrated circuit disposed on a surface of the first flat plate portion opposite to a surface on which the one or more first patch antennas are provided, wherein the radio frequency integrated circuit performs a transmission-type signal processing of up-converting a signal received from a base band integrated circuit to output to the one or more first patch antennas and the one or more second patch antennas, or a reception-type signal processing of down-converting a radio frequency signal received from the one or more first patch antennas and the one or more second patch antennas to output to the base band integrated circuit, or both of the transmission-type signal processing and the reception-type signal processing.

21. The antenna module according to claim 1,
wherein each of the one or more first patch antennas produces two orthogonal polarized waves, and each of the one or more second patch antennas produces one polarized wave.

22. An antenna module, comprising
a substrate including a first flat plate portion and a second flat plate portion, wherein the first flat plate portion and the second flat plate portion are continuous, and normal directions of the first flat plate portion and the second flat plate portion are intersected with each other;
one or more first patch antennas provided on the first flat plate portion; and
one or more second patch antennas provided on the second flat plate portion,
wherein the one or more first patch antennas are arranged in at least a column in a column direction parallel to a boundary line between the first flat plate portion and the second flat plate portion,
wherein the one or more second patch antennas are arranged in at least a column in the column direction, and
wherein a size, in a second direction, of each one or more of the one or more second patch antennas arranged in a column located farthest from the boundary line is smaller than a size, in a first direction, of the one or more first patch antennas, and a width of the second flat plate portion is narrower than a width of the first flat portion,
wherein the second direction is perpendicular to the column direction and parallel to a main surface of the second flat plate portion, and the first direction is perpendicular to the column direction and parallel to a main surface of the first flat plate portion,
wherein each one or more of the one or more second patch antennas arranged in the column located farthest from the boundary line is a one-side-short-circuit microstrip antenna,
wherein the first flat plate portion has a first main surface and a second main surface facing away from each other,
wherein the second flat plate portion has a third main surface and a fourth main surface facing away from each other,
wherein the first main surface and the third main surface are continuous, and the second main surface and the fourth main surface are continuous,
wherein the one or more first patch antennas are disposed near the first main surface among the first main surface and the second main surface,
wherein the one or more second patch antennas are disposed near the third main surface among the third main surface and the fourth main surface,
wherein the antenna module further comprises one or more notch antennas or one or more dipole antennas, and the one or more notch antennas or the one or more dipole antennas are disposed between the one or more first patch antennas and the one or more second patch antennas,
wherein the one or more first patch antennas form a first polarized wave and a second polarized wave different from the first polarized wave,
wherein the one or more second patch antennas form a third polarized wave,
wherein the one or more notch antennas or the one or more dipole antennas form a fourth polarized wave different from the third polarized wave,
wherein the first polarized wave and the second polarized wave have directivity in a direction perpendicular to the first flat plate portion, and
wherein the third polarized wave and the fourth polarized wave have directivity in a direction perpendicular to the second flat plate portion.

* * * * *